US012640823B2

(12) United States Patent
Zhang et al.

(10) Patent No.: US 12,640,823 B2
(45) Date of Patent: May 26, 2026

(54) METHOD AND APPARATUS FOR ANTENNA CALIBRATION

(71) Applicant: Telefonaktiebolaget LM Ericsson (publ), Stockholm (SE)

(72) Inventors: Hao Zhang, Guangzhou (CN); Ang Feng, Solna (SE); Georgy Levin, Ottawa (CA); Anders Widebrant, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 256 days.

(21) Appl. No.: 18/036,466

(22) PCT Filed: Dec. 3, 2020

(86) PCT No.: PCT/CN2020/133590
§ 371 (c)(1),
(2) Date: May 11, 2023

(87) PCT Pub. No.: WO2022/116084
PCT Pub. Date: Jun. 9, 2022

(65) Prior Publication Data
US 2024/0014908 A1    Jan. 11, 2024

(51) Int. Cl.
*H04B 17/12* (2015.01)

(52) U.S. Cl.
CPC .................................... *H04B 17/12* (2015.01)

(58) Field of Classification Search
None
See application file for complete search history.

(56) References Cited

U.S. PATENT DOCUMENTS

| | | | |
|---|---|---|---|
| 9,025,575 B2 | 5/2015 | McGowan et al. | |
| 2020/0351000 A1 | 11/2020 | Da Silveira et al. | |
| 2022/0368433 A1* | 11/2022 | Yu .......................... | H04B 17/14 |

FOREIGN PATENT DOCUMENTS

| | | |
|---|---|---|
| CN | 103107836 A | 5/2013 |
| CN | 103490833 A | 1/2014 |
| CN | 104768166 A | 7/2015 |

(Continued)

OTHER PUBLICATIONS

Extended European Search Report mailed Aug. 8, 2024 for European Patent Application No. 20963931.9, 10 pages.

(Continued)

*Primary Examiner* — Idowu O Osifade
(74) *Attorney, Agent, or Firm* — Sage Patent Group

(57) ABSTRACT
Embodiments of the present disclosure provide method and apparatus for antenna calibration. A method implemented at a first network device. The method includes receiving a first radio signal generated by the first network device via a receiver connected to an antenna of the first network device.

(Continued)

The method further includes receiving at least one second radio signal from at least one second network device via the antenna of the first network device. The method further includes determining an impairment related to the antenna of the first network device based on the received first radio signal and the at least one second radio signal. There is a line of sight (LOS) path between the antenna of the first network device and the antenna of each of the at least one second network device.

20 Claims, 18 Drawing Sheets

(56) References Cited

FOREIGN PATENT DOCUMENTS

| | | | | | |
|----|--------------|-----|---------|--------|-----------|
| CN | 109004994  A |     | 12/2018 |        |           |
| CN | 110620605  A |     | 12/2019 |        |           |
| EP | 3301846  A1  | *   | 4/2018  | ......... | H04B 7/0417 |
| JP | 2017169150  A |    | 9/2017  |        |           |
| WO | 2011085082  A2 |   | 7/2011  |        |           |
| WO | 2013124762  A1 |   | 8/2013  |        |           |
| WO | 2019078766  A1 |   | 4/2019  |        |           |

OTHER PUBLICATIONS

National Instruments; "Over The Air Calibration for Reciprocity Based MIMO"; R1-1609725; 3GPP TSG RAN WG1 Meeting #86bis; Lisbon, Portugal; Oct. 10-14, 2016; 8 pages.

Kurt, Sinan et al.; "Pass-Loss Modeling for Wireless Sensor Networks"; IEEE Antennas & Propagation Magazine, Feb. 2017; 20 pages.

International Search Report and Written Opinion of the International Searching Authority, PCT/CN2020/133590, mailed Sep. 2, 2021, 9 pages.

CMCC, "High level view of 3D-MIMO schemes," 3GPP TSG RAN WG1 Meeting #78bis, R1-143955, Llubljana, Slovenia, Oct. 6-10, 2014, 2 pages.

3GPP TS 38.211 v15.8.0 (Dec. 2019); 3rd Generation Partnership Project; Technical Specification Group Radio Access Network; NR; Physical channels and modulation (Release 15); 97 pages.

Krim, Hamid et al, "Two Decades of Array Signal Processing Research—The Parametric Approach," IEEE Xplore, IEEE Signal Processing Magazine, Jul. 1996, 28 pages.

Qualcomm Incorporated, "TR 36.877 v1.0.0 LTE Device to Device Proximity Services; User Equipment (UE) radio transmission and reception," RP-141897, 3GPP TSG-RAN #66, Maui, USA, Dec. 8-11, 2014, 154 pages.

* cited by examiner

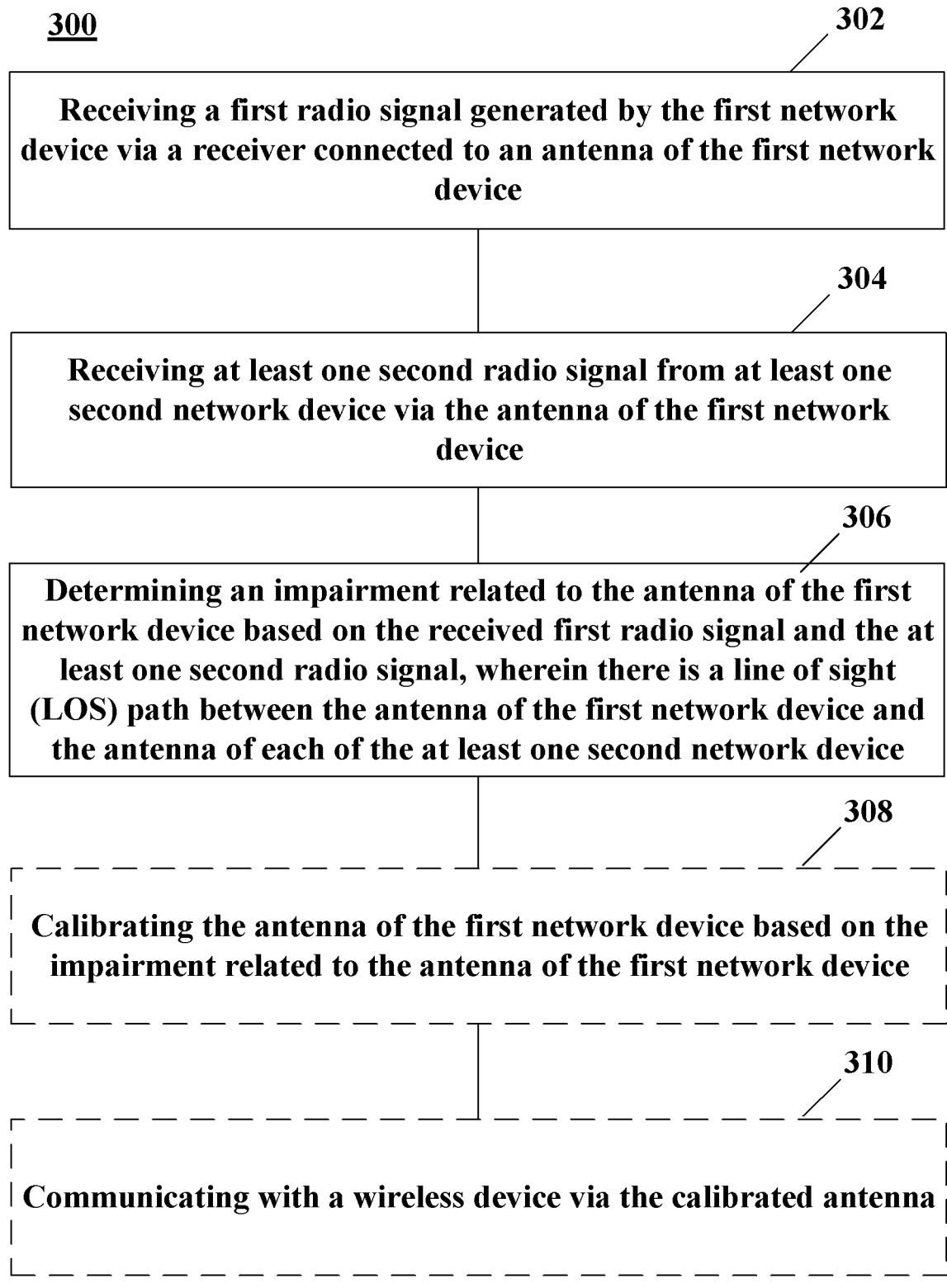

300       302

Receiving a first radio signal generated by the first network device via a receiver connected to an antenna of the first network device

304

Receiving at least one second radio signal from at least one second network device via the antenna of the first network device

306

Determining an impairment related to the antenna of the first network device based on the received first radio signal and the at least one second radio signal, wherein there is a line of sight (LOS) path between the antenna of the first network device and the antenna of each of the at least one second network device

308

Calibrating the antenna of the first network device based on the impairment related to the antenna of the first network device

310

Communicating with a wireless device via the calibrated antenna

Communicating with a first network device, wherein an impairment related to an antenna of the first network device is determined by the first network device based on a first radio signal generated by the first network device and at least one second radio signal received from at least one second network device

850

860

METHOD AND APPARATUS FOR ANTENNA CALIBRATION

CROSS REFERENCE TO RELATED APPLICATIONS

This application is a 35 U.S.C. § 371 national stage application of PCT International Application No. PCT/CN2020/133590 filed on Dec. 3, 2020, the disclosure and content of which is incorporated by reference herein in its entirety.

TECHNICAL FIELD

The present disclosure relates generally to the technology of wireless communication, and in particular, to method and apparatus for antenna calibration.

BACKGROUND

This section introduces aspects that may facilitate better understanding of the present disclosure. Accordingly, the statements of this section are to be read in this light and are not to be understood as admissions about what is in the prior art or what is not in the prior art.

In a radio access network (RAN) of a wireless communication system such as fourth generation (4G) and fifth generation (5G), a massive MIMO (Multiple Input Multiple Output) or FD-MIMO (full-dimension MIMO) technology is used to enhance cell coverage, increase throughput, improve spectrum usage, etc. A large number of antennas may be used to support this technology. In high frequency wireless networks utilizing millimeter-wave spectrum, the number of antennas may be expected to reach hundreds. For example, the MIMO communication systems may rely upon concurrent signal transmissions from multiple antenna subarrays of an antenna array to form desired radiation patterns. An antenna subarray may be made of one or more antenna elements. Theoretically, by altering the signal characteristics of concurrently transmitted signals, such as by altering the phase or magnitude of the concurrently transmitted signals, one or both of lobes and nulls may be formed in desired locations. On transmission, radiation pattern lobes are desirable to focus energy at a location of a receiver, and nulls are desirable to reduce the interference seen by other receivers. When receiving, a lobe can increase the signal strength of a desired transmitter, and a null may eliminate interference from a non-desirable transmitter.

Multiple factors, referred to herein as antenna impairments, may affect the ideal, or theoretical, transmission characteristics of an antenna array. Such impairments may include, but are not limited to, differences in the signal paths between the transmitters and the antenna subarrays of the antenna array, mutual coupling between antenna subarrays, ground plane imperfections, mechanical tolerance differences, differences in radio equipment hardware, and the like. Impairments alter the ideal, or theoretical, antenna radiation pattern characteristics and therefore affect the ability to accurately place a lobe or null where desired. Such impairments may result in lower system throughput.

In current 4G and 5G radio access network (RAN), antenna calibration (AC) may be used in multiple antenna systems to compensate the impairment of phase and amplitude among radio branches. The phase and amplitude distortion of radio chains may be measured and compensated so that the signals are aligned at the antenna reference ports to achieve a good beamforming performance. This requires the AC to calibrate all hardware of the radio chains, including a radio distributed network (RDN) that is used for calibration itself.

There may be various types of AC. FIG. 1 schematically depicts an example of antenna calibration. The AC as shown in FIG. 1 is to send and receive special calibration signals through the radio chains and antenna arrays. The phase, delay and amplitude of each radio branch is detected, measured, and compensated as shown in FIG. 1. DL denotes downlink, UL denotes uplink, Rx denotes receiving, Tx denotes transmitting, ADC denotes Analog to Digital Converter, DAC denotes Digital to Analog Converter and AFU denotes antenna integrated filter unit.

As shown in FIG. 1, based on a command from an algorithm, the DL AC injection module or circuit may input a DL AC signal to a radio Rx/Tx hardware which may include multiple radio branches. The output signal of the radio Rx/Tx hardware may pass a sum module or circuit to generate a summed AC signal. The summed AC signal may pass the ADC to generate a digital DL AC signal. The digital DL AC signal may be captured by a DL AC capture module or circuit. Finally the captured DL AC signal may be input to the algorithm for processing and then the phase, delay and amplitude of each radio branch may be detected, measured, and compensated.

Based on a command from the algorithm, the UL AC injection module or circuit may input the UL AC signals to a DAC to generate an analog UL AC signal. The analog UL AC signal may be split into multiple UL AC signals by a split module or circuit. The split UL AC signals may be input to the radio Rx/Tx hardware. The output signal of the radio Rx/Tx hardware may be captured by a UL AC capture module or circuit. Finally the captured UL AC signal may be input to the algorithm for processing and then the phase, delay and amplitude of each radio branch may be detected, measured, and compensated.

The AC solution of FIG. 1 requires a RDN or a power divider network and AFU to be calibrated during production.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems of some existing AC solutions. For example, the AC solution of FIG. 1 requires a RDN or a power divider network and AFU to be calibrated during production as described above. However the impairments of the RDN and the AFU may be changed due to various factors such as temperature. For example, the phase drift of AFU can be up to 50 degrees at different temperatures, which may impact the beamforming performance. Please note that putting the AFU out of AC loop can help on cost saving. In some product architecture the AFU is inside the AC loop and it doesn't need compensation, but the RDN still needs to be compensated.

If the impairment of the AFU and relevant devices is not compensated, it may degrade the accuracy of AC in the multiple antenna system, thus leading to poor beamforming performance. The cell coverage and throughput may be impacted consequently.

The RDN may provide a feedback path for AC, but it also brings a problem in which the measurement point may be actually not the same as the antenna reference points. If the two points are not aligned for example due to RDN variations, the beamforming performance may be deteriorated.

Some AC solutions may compensate the temperature drift with pre-measurement in production, and record a compensate curve related to the temperature drift into a database. However, there may be an impairment difference over antenna products. It's hard to do production measurement in various scenarios such as high and low temperature for every product because the cost may be too high.

To overcome or mitigate at least one of the above mentioned problems or other problem(s), the embodiments of the present disclosure propose an improved AC solution.

A first aspect of the present disclosure provides a method implemented at a first network device. The method comprises receiving a first radio signal generated by the first network device via a receiver connected to an antenna of the first network device. The method further comprises receiving at least one second radio signal from at least one second network device via the antenna of the first network device. The method further comprises determining an impairment related to the antenna of the first network device based on the received first radio signal and the at least one second radio signal. There is a line of sight (LOS) path between the antenna of the first network device and the antenna of each of the at least one second network device.

In an embodiment, the method may further comprise calibrating the antenna of the first network device based on the impairment related to the antenna of the first network device. The method may further comprise communicating with a wireless device via the calibrated antenna.

In an embodiment, determining the impairment related to the antenna of the first network device based on the received first radio signal and the at least one second radio signal may comprise removing a propagation channel impact of a transmitter of one of the at least one second network device; determining channel information of Over The Air, OTA, of the second radio signal from the one of the at least one second network device; determining an impairment of the receiver connected to the antenna of the first network device; determining signal characteristics of the second radio signal received from the one of the at least one second network device; and determining the impairment related to the antenna of the first network device based on the removed propagation channel impact of the transmitter of one of the at least one second network device, the channel information of OTA of the second radio signal from the one of the at least one second network device, the impairment of the receiver connected to the antenna of the first network device, and the signal characteristics of the second radio signal received from the one of the at least one second network device.

In an embodiment, the propagation channel impact of the transmitter of one of the at least one second network device may be removed based on the channel information of OTA of the second radio signal from the one of the at least one second network device, the impairment of the receiver connected to the antenna of the first network device, and the signal characteristics of the second radio signal received from the one of the at least one second network device.

In an embodiment, the channel information of OTA of the second radio signal from the one of the at least one second network device is determined based on an angle of arrival (AoA) of the second radio signal from the one of the at least one second network device.

In an embodiment, the AoA of the second radio signal from the one of the at least one second network device may be determined based on antenna information of the one of the at least one second network device and the first network device.

In an embodiment, the antenna information may comprise at least one of a geometry position of an antenna; an elevation of an antenna; a direction of an antenna; or an azimuth of an antenna.

In an embodiment, the signal characteristics of the second radio signal received from the one of the at least one second network device may be determined based on a transfer function related to the LOS path between the antenna of the first network device and the antenna of the one of the at least one second network device.

In an embodiment, the transfer function related to the LOS path between the antenna of the first network device and the antenna of the one of the at least one second network device may be determined based on a first peak of a power delay profile of the transfer function related to the LOS path between the antenna of the first network device and the antenna of the one of the at least one second network device.

In an embodiment, the first peak of the power delay profile of the transfer function related to the LOS path between the antenna of the first network device and the antenna of the one of the at least one second network device is required to be greater than a threshold.

In an embodiment, the signal characteristics of the second radio signal received from the one of the at least one second network device may comprise a phase impairment of the second radio signal received from the one of the at least one second network device.

In an embodiment, determining the impairment related to the antenna of the first network device based on the received first radio signal and the at least one second radio signal may comprise removing a phase vector induced by an incoming wave of each of the at least one second radio signal; combining the at least one second radio signal without the induced phase vector; removing a propagation channel impact of a transmitter of the combined second radio signal; determining an impairment of the receiver connected to the antenna of the first network device; determining signal characteristics of the combined second radio signal; and determining the impairment related to the antenna of the first network device based on the removed propagation channel impact of the transmitter of the combined second radio signal, the impairment of the receiver connected to the antenna of the first network device, and the signal characteristics of the combined second radio signal.

In an embodiment, the phase vector induced by the incoming wave of each of the at least one second radio signal may be removed based on an angle of arrival (AoA) of an incoming wave of each of the at least one second radio signal.

In an embodiment, the AoA of the incoming wave of each of the at least one second radio signal may be determined based on antenna information of a corresponding second network device and the first network device.

In an embodiment, the antenna information may comprise at least one of a geometry position of an antenna; an elevation of an antenna; a direction of an antenna; or an azimuth of an antenna.

In an embodiment, the at least one second radio signal without the induced phase vector may be combined based on Maximum Ratio Combining (MRC).

In an embodiment, the propagation channel impact of the transmitter of the combined second radio signal may be removed based on the impairment of the receiver connected to the antenna of the first network device and the signal characteristics of the combined second radio signal.

In an embodiment, the signal characteristics of the combined second radio signal may comprise a phase impairment of the combined second radio signal In an embodiment, the impairment of the receiver connected to the antenna of the first network device may be determined based on the received first radio signal.

In an embodiment, the first radio signal and the at least one second radio signal may be transmitted by using at least one of Code Division Multiple Access, CDMA, Time Division Multiple Address, TDMA, or Frequency Division Multiple Access, FDMA.

In an embodiment, when the first radio signal and/or the at least one second radio signal are transmitted by using FDMA, the first radio signal and/or the at least one second radio signal may be repeated by N times. N is a number of the network devices in a network.

In an embodiment, the antenna of the first network device may be an antenna subarray of an antenna array or an antenna element of a radio distributed network.

In an embodiment, the antenna of the first network device may comprise at least one antenna integrated filter unit and/or a radio distribution network, RDN.

In an embodiment, the first network device may be a radio access network (RAN).

In an embodiment, the first radio signal and the at least one second radio signal may be synchronization reference signals.

In an embodiment, the first radio signal may be generated via a transmitter and a coupler network of the first network device.

In an embodiment, the first radio signal may be received via the receiver connected to the antenna of the first network device through the coupler network of the first network device.

A second aspect of the present disclosure provides a method implemented at a terminal device. The method comprises communicating with a first network device. An impairment related to an antenna of the first network device is determined by the first network device based on a first radio signal generated by the first network device and at least one second radio signal received from at least one second network device.

A third aspect of the present disclosure provides a first network device. The first network device comprises a processor; and a memory, the memory containing instructions executable by the processor, whereby the first network device is operative to receive a first radio signal generated by the first network device via a receiver connected to an antenna of the first network device. The first network device is further operative to receive at least one second radio signal from at least one second network device via the antenna of the first network device. The first network device is further operative to determine an impairment related to the antenna of the first network device based on the received first radio signal and the at least one second radio signal. There is a line of sight (LOS) path between the antenna of the first network device and the antenna of each of the at least one second network device A fourth aspect of the present disclosure provides a terminal device. The terminal device comprises a processor; and a memory, the memory containing instructions executable by the processor, whereby the terminal device is operative to communicate with a first network device. An impairment related to an antenna of the first network device is determined by the first network device based on a first radio signal generated by the first network device and at least one second radio signal received from at least one second network device.

A fifth aspect of the present disclosure provides a first network device. The first network device comprises a first receiving module, a second receiving module, and a determining module. The first receiving module may be configured to receive a first radio signal generated by the first network device via a receiver connected to an antenna of the first network device. The second receiving module may be configured to receive at least one second radio signal from at least one second network device via the antenna of the first network device. The determining module may be configured to determine an impairment related to the antenna of the first network device based on the received first radio signal and the at least one second radio signal. There is a LOS path between the antenna of the first network device and the antenna of each of the at least one second network device.

In an embodiment, the first network device may further comprise a calibrating module configured to calibrate the antenna of the first network device based on the impairment related to the antenna of the first network device. The first network device may further comprise a concatenating module configured to communicate with a wireless device via the calibrated antenna.

A sixth aspect of the present disclosure provides a terminal device. The terminal device comprises a communicating module. The communicating module may be configured to communicate with a first network device. An impairment related to an antenna of the first network device is determined by the first network device based on a first radio signal generated by the first network device and at least one second radio signal received from at least one second network device.

A seventh aspect of the present disclosure provides a computer program product comprising instructions which, when executed on at least one processor, cause the at least one processor to carry out any of the methods according to the first and second aspects of the disclosure.

An eighth aspect of the present disclosure provides a computer-readable storage medium storing instructions which, when executed on at least one processor, cause the at least one processor to carry out any of the methods according to the first and second aspects of the disclosure.

A ninth aspect of the present disclosure provides a communication system including a host computer including: processing circuitry configured to provide user data; and a communication interface configured to forward the user data to a cellular network for transmission to a terminal device. The cellular network includes a first network device above mentioned, and/or the terminal device above mentioned.

In embodiments of the present disclosure, the system further includes the terminal device, wherein the terminal device is configured to communicate with the first network device.

In embodiments of the present disclosure, the processing circuitry of the host computer is configured to execute a host application, thereby providing the user data; and the terminal device includes processing circuitry configured to execute a client application associated with the host application.

A tenth aspect of the present disclosure provides a communication system including a host computer including: a communication interface configured to receive user data originating from a transmission from a terminal device; a first network device. The transmission is from the terminal device to the first network device. The first network device is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

An eleventh aspect of the present disclosure provides a method implemented in a communication system which may include a host computer, a first network device and a terminal device. The method may comprise providing user data at the host computer. Optionally, the method may comprise, at the host computer, initiating a transmission carrying the user data to the terminal device via a cellular network comprising the first network device which may perform any step of the method according to the first aspect of the present disclosure.

A twelfth aspect of the present disclosure provides a communication system including a host computer. The host computer may comprise processing circuitry configured to provide user data, and a communication interface configured to forward the user data to a cellular network for transmission to a terminal device. The cellular network may comprise a first network device having a radio interface and processing circuitry. The first network device's processing circuitry may be configured to perform any step of the method according to the first aspect of the present disclosure.

A thirteenth aspect of the present disclosure provides a method implemented in a communication system which may include a host computer, a first network device and a terminal device. The method may comprise providing user data at the host computer. Optionally, the method may comprise, at the host computer, initiating a transmission carrying the user data to the terminal device via a cellular network comprising the first network device. The terminal device may perform any step of the method according to the second aspect of the present disclosure.

A fourteenth aspect of the present disclosure provides a communication system including a host computer. The host computer may comprise processing circuitry configured to provide user data, and a communication interface configured to forward user data to a cellular network for transmission to a terminal device. The terminal device may comprise a radio interface and processing circuitry. The terminal device's processing circuitry may be configured to perform any step of the method according to the second aspect of the present disclosure.

A fifteenth aspect of the present disclosure provides a method implemented in a communication system which may include a host computer, a first network device and a terminal device. The method may comprise, at the host computer, receiving user data transmitted to the first network device from the terminal device which may perform any step of the method according to the second aspect of the present disclosure.

A sixteenth aspect of the present disclosure provides a communication system including a host computer. The host computer may comprise a communication interface configured to receive user data originating from a transmission from a terminal device to a first network device. The terminal device may comprise a radio interface and processing circuitry. The terminal device's processing circuitry may be configured to perform any step of the method according to the second aspect of the present disclosure.

A seventeenth aspect of the present disclosure provides a method implemented in a communication system which may include a host computer, a first network device and a terminal device. The method may comprise, at the host computer, receiving, from the first network device, user data originating from a transmission which the first network device has received from the terminal device. The first network device may perform any step of the method according to the first aspect of the present disclosure.

An eighteenth aspect of the present disclosure provides a communication system which may include a host computer. The host computer may comprise a communication interface configured to receive user data originating from a transmission from a terminal device to a first network device. The first network device may comprise a radio interface and processing circuitry. The first network device's processing circuitry may be configured to perform any step of the method according to the first aspect of the present disclosure.

Embodiments herein may provide many advantages, of which a non-exhaustive list of examples follows. In some embodiments herein, the proposed solution can leverage the 3GPP standard signal, e.g., RIBS, to do measurement and compensation for antenna impairment such as AFU and RDN impairment online and over-the-air. In some embodiments herein, the proposed solution can compensate the antenna impairment due to the environment changes such as temperature change, aging, etc. In some embodiments herein, the proposed solution can save the cost in antenna production. In some embodiments herein, the proposed solution can check the OTA AC status periodically. In some embodiments herein, the proposed solution can be easily deployed in the operation networks for example via a software upgrade. In some embodiments herein, the proposed solution can provide accurate impairment estimation via different signal separation approaches. In some embodiments herein, the proposed solution can remove the uncertainty in the OTA calibration. In some embodiments herein, the proposed solution can provide an advanced receiver which is resilient to interference and noise.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to an embodiment of the present disclosure;

DETAILED DESCRIPTION

Figure 1:
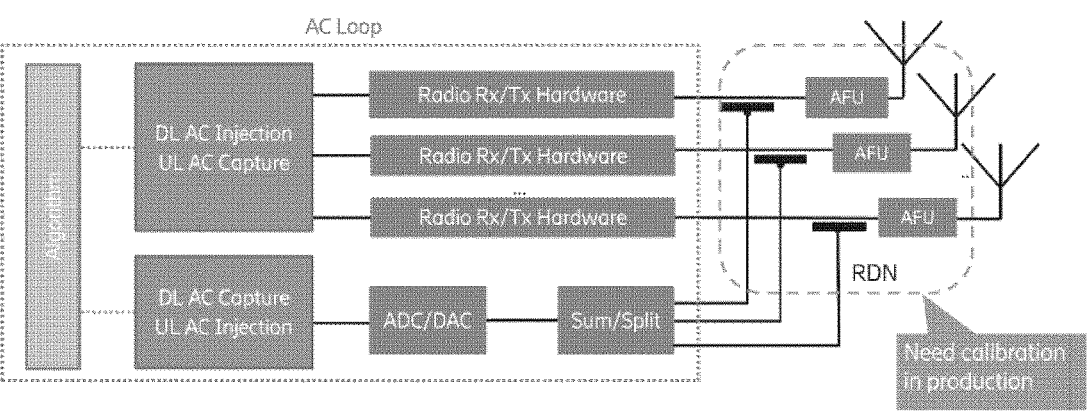
FIG. 1 schematically depicts an example of antenna calibration.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "network node" or "network side node" or "network device" refers to a device with accessing function in a communication network via which a terminal device accesses to the network and receives services therefrom. The network device may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL, transmission refers to a transmission from a network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

Figure 2:
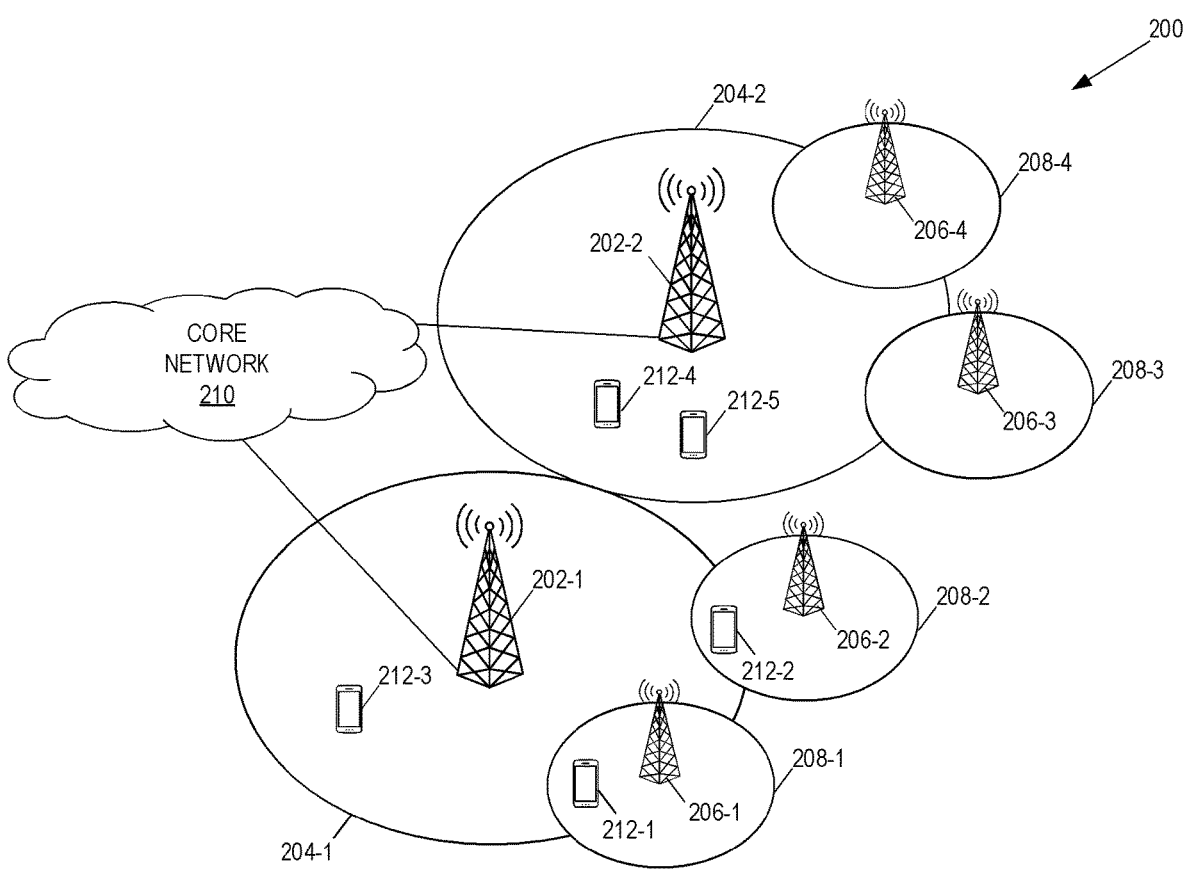
FIG. 2 schematically shows an example of a cellular communications system in which embodiments of the present disclosure may be implemented.

FIG. 2 schematically shows an example of a cellular communications system 200 in which embodiments of the present disclosure may be implemented. In the embodiments described herein, the cellular communications system 200 includes a RAN and a core network. In this example, the RAN includes base stations 202-1 and 202-2, which in the LTE include eNBs (i.e., LTE RAN nodes connected to EPC (Evolved Packet Core)) and in NR include gNB (i.e., NR RAN nodes connected to (5G core network)), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as 5GC and in LTE is is referred to as EPC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs or terminal devices, but the present disclosure is not limited thereto.

FIG. 3 shows a flowchart of a method according to an embodiment of the present disclosure, which may be performed by an apparatus implemented in/as a first network device or communicatively coupled to the first network device. As such, the apparatus may provide means or modules for accomplishing various parts of the method 300 as well as means or modules for accomplishing other processes in conjunction with other components. The first network device may be any suitable network node, entity or function which can use an antenna such as array antenna to transmit and/or receive information such as message or data. In an embodiment, the first network device may be a base station such as eNB, gNB, etc. In another embodiment, the first network device may be a radio access network (RAN).

At block 302, the first network device may receive a first radio signal generated by the first network device via a receiver connected to an antenna of the first network device.

As used herein, the term "antenna" may comprise one or more antenna components. For example, the antenna components may comprise at least one of at least one antenna device, at least one filter (such as AFU), at least one combiner, a feeder system, at least one connector, RDN, etc. For example, the filter may control transmission and reception of wanted and unwanted signals. The combiner may make it possible to reduce the number of needed antennas and feeders. The feeder system may comprise feeder(s), connector(s), and jumper(s).

In an embodiment, the "antenna" may comprise any suitable antenna components which can not be calibrated by using the AC solution of FIG. 1.

For example, the first network device may generate the first radio signal only for the purpose of AC (e.g. DL AC). As another example, the first network device may generate the first radio signal and transmit it to a wireless device (such as another network device or a terminal device) via an antenna of the first network device. The first network device may receive the first radio signal by a power divider (or a coupler). The power divider may divide the first radio signal into two or more output signals. For example, the power divider may divide the first radio signal into two output signals. One output signal may be received by the receiver connected to the antenna of the first network device and the other output signal may be transmitted via the antenna of the first network device.

In an embodiment, the first radio signal may be generated via a transmitter and a coupler network (such as RDN) of the first network device.

In an embodiment, the first radio signal may be received via the receiver connected to the antenna of the first network device through the coupler network of the first network device.

The antenna of the first network device may be any suitable antenna. For example, the antenna of the first network device may be a single antenna or an antenna subarray of an antenna array or an antenna element of a radio distributed network.

The antenna of the first network device may comprise any other suitable component. In an embodiment, the antenna of the first network device may comprise at least one antenna integrated filter unit (AFU) and/or a radio distribution network (RDN). For example, the antenna of the first network device may be a composite antenna which may contain a RDN and an antenna array. The RDN may be a linear passive network which distributes the RF (radio frequency) power generated by a transceiver unit array to the antenna array, and/or distributes the radio signals collected by the antenna array to the transceiver unit array. In an embodiment, the RDN may be same as the RDN as described in 3GPP TS 38.104 V16.5.0, the disclosure of which is incorporated by reference herein in its entirety.

The first radio signal may be any suitable radio signal. For example, the first radio signal may be a reference signal such as synchronization reference signal, etc.

The first radio signal may be transmitted based on any suitable wireless communication standard. In an embodiment, the first radio signal may be transmitted by using at least one of Code Division Multiple Access (CDMA), Time Division Multiple Address (TDMA), or Frequency Division Multiple Access (FDMA).

In an embodiment, when the first radio signal is transmitted based on FDMA, the first radio signal may be repeated by N times. N may be any suitable integer, such as the number of the network devices in a network.

In an embodiment, the first radio signal may be a RIBS (Radio Interface Based Synchronization) reference signal. The RIBS reference signal may be used to estimate and compensate the impairment of AFU and RDN. The RIBS reference signal can setup communication between base stations in a TDD (Time Division Duplex) system. The RIBS reference signal may be used to do synchronization and monitoring between base stations over-the-air. The RIBS reference signal is the radio interface based signal which may be used to synchronize the timing between neighboring Radio Base Stations (RBS). The RIBS reference signal may be transmitted and received periodically between RB Ss. The RIBS reference signal may be a 5G compliant reference signal that can be transmitted and received on the operating network. This feature may be suitable for AC to handle the temperature drift in AFU and RDN during a heavy traffic time. It also can check the status of AC periodically to ensure the best beamforming performance.

Figure 4A:
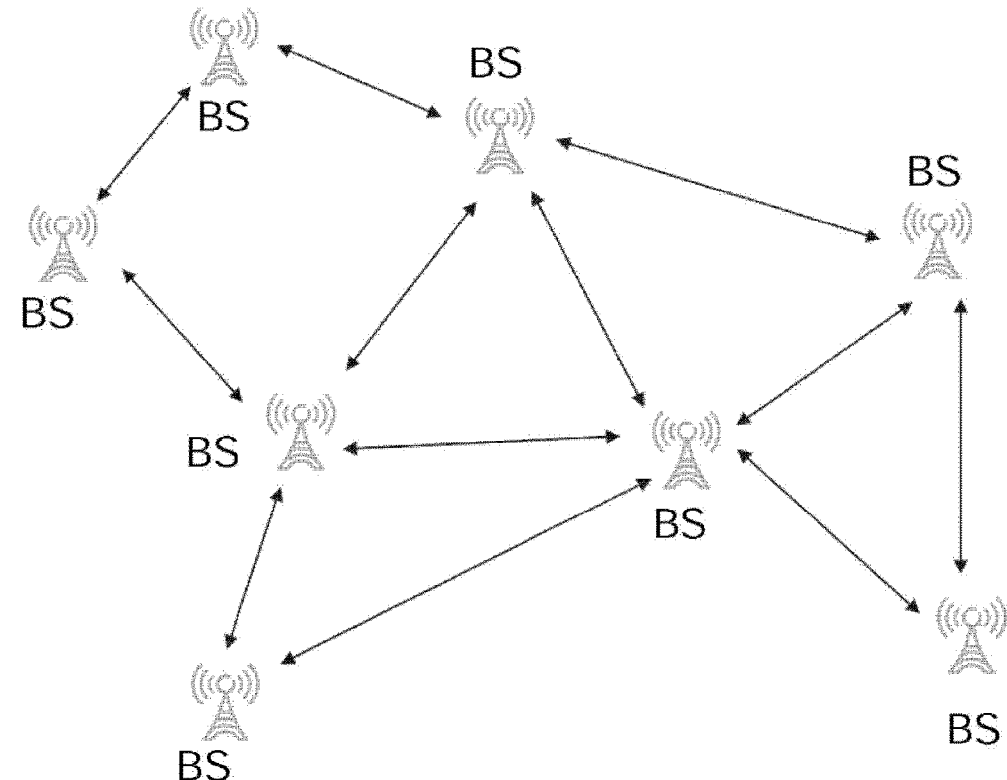
FIG. 4a schematically shows an example of RIBS reference signal in a cellular network according to an embodiment of the present disclosure.

FIG. 4*a* schematically shows an example of RIBS reference signal in a cellular network according to an embodiment of the present disclosure. As shown in FIG. 4a. The positions of BSs are fixed and known. The positions of BSs can be determined in various ways. For example, the positions of BSs can be determined by a positioning system such as global positioning system (GPS). Even without the positioning system such as GPS, the positions of BSs can be measured at an installation stage of BSs. Since BSs cannot move, the positions of BSs can be valid for a long time such as whole lifetime of the BSs.

In an embodiment, the RIBS may be used to detect and measure the RDN impairment of a multiple antenna radio. In another embodiment, the RIBS may be used to detect and measure the impairment of AFU and RDN of the multiple antenna radio. RIBS may be transmitted in a DL slot and symbols.

As shown in FIG. 4a, each BS as a receiver can find multiple RIBS TX BSs to transmit RIBS to it. In particular, one or more BS-to-BS LOS (line of sight) channels may be found in the cellular network. For example, mmWave requires clear sight between BS and UE. Cell densification provides that UE can have LOS channel with at least one BS, which is also applicable to BS and BS communication. The LOS channel may be considered as a main scenario in some communication network such as the 5G system.

At block 304, the first network device may receive at least one second radio signal from at least one second network device via the antenna of the first network device.

The second network device may be any suitable network node, entity or function which can use an antenna such as array antenna to transmit and/or receive information such as message or data. In an embodiment, the second network device may be a base station such as eNB, gNB, etc. In another embodiment, the second network device may be a radio access network (RAN).

The second radio signal may be any suitable radio signal. For example, the second radio signal may be a reference signal such as synchronization reference signal, etc.

The second radio signal may be transmitted based on any suitable wireless communication standard. In an embodiment, the second radio signal may be transmitted based on at least one of CDMA, TDMA, or FDMA.

In an embodiment, when the second radio signal is transmitted by using FDMA, the second radio signal may be repeated by N times. N may be any suitable integer, such as the number of the network devices in a network.

In an embodiment, the second radio signal may be a RIBS reference signal.

In an embodiment, there is a line of sight (LOS) path between the antenna of the first network device and the antenna of each of the at least one second network device.

At block 306, the first network device may determine an impairment related to the antenna of the first network device based on the received first radio signal and the at least one second radio signal. It is noted that the impairment may be any suitable impairment such as phase impairment, delay impairment, amplitude impairment, etc. though some embodiments of the present disclosure are mainly described in relation to phase impairment being used as non-limiting examples.

In an embodiment, the impairment related to the antenna of the first network device may be determined based on the received first radio signal and one of the at least one second radio signal.

In an embodiment, the first network device may determine an impairment related to the antenna of the first network device based on the received first radio signal and one of the at least one second radio signal. For example, the first network device may select one of the at least one second radio signal. Alternatively only one second network device may be scheduled to transmit the second radio signal to the first network device.

In an embodiment, the first network device may determine channel information of OTA of the second radio signal from the one of the at least one second network device.

In an embodiment, the channel information of OTA of the second radio signal from the one of the at least one second network device may be determined based on an AoA of the second radio signal from the one of the at least one second network device.

In an embodiment, the AoA of the second radio signal from the one of the at least one second network device may be determined based on antenna information of the one of the at least one second network device and the first network device.

In an embodiment, the antenna information may comprise at least one of a geometry position of an antenna; an elevation of an antenna; a direction of an antenna; or an azimuth of an antenna.

In an embodiment, the first network device may determine an impairment of the receiver connected to the antenna of the first network device.

In an embodiment, the impairment of the receiver connected to the antenna of the first network device may be determined based on the received first radio signal.

In an embodiment, the first network device may determine signal characteristics of the second radio signal received from the one of the at least one second network device.

In an embodiment, the first network device may remove a propagation channel impact of a transmitter of one of the at least one second network device.

In an embodiment, the propagation channel impact of the transmitter of one of the at least one second network device may be removed based on the channel information of OTA of the second radio signal from the one of the at least one second network device, the impairment of the receiver connected to the antenna of the first network device, and the signal characteristics of the second radio signal received from the one of the at least one second network device.

In an embodiment, the signal characteristics of the second radio signal received from the one of the at least one second network device may be determined based on a transfer function related to the LOS path between the antenna of the first network device and the antenna of the one of the at least one second network device.

In an embodiment, the transfer function related to the LOS path between the antenna of the first network device and the antenna of the one of the at least one second network device may be determined based on a first peak of a power delay profile of the transfer function related to the LOS path between the antenna of the first network device and the antenna of the one of the at least one second network device.

In an embodiment, the first peak of the power delay profile of the transfer function related to the LOS path between the antenna of the first network device and the antenna of the one of the at least one second network device is required to be greater than a threshold.

In an embodiment, the signal characteristics of the second radio signal received from the one of the at least one second network device may comprise a phase impairment of the second radio signal received from the one of the at least one second network device.

In an embodiment, the first network device may determine the impairment related to the antenna of the first network device based on the removed propagation channel impact of the transmitter of one of the at least one second network device, the channel information of OTA of the second radio signal from the one of the at least one second network device, the impairment of the receiver connected to the antenna of the first network device, and the signal characteristics of the second radio signal received from the one of the at least one second network device.

Figure 4B:
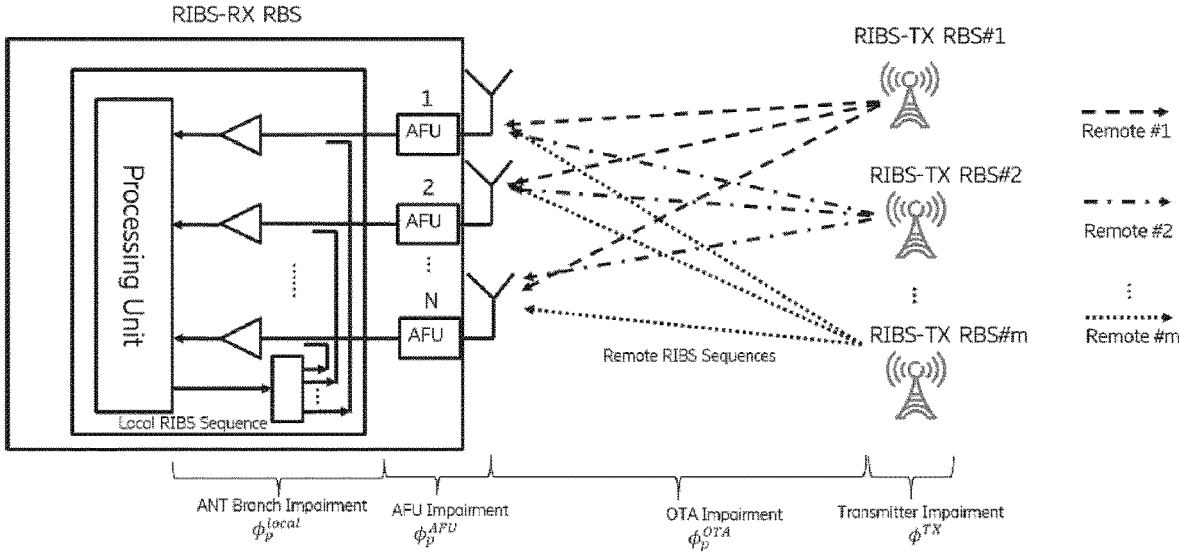
FIG. 4b schematically shows an example of impairments in a cellular network according to an embodiment of the present disclosure.

FIG. 4b schematically shows an example of impairments in a cellular network according to an embodiment of the present disclosure. It is noted that the RIBS signal may be replaced with any other suitable signal. As shown in FIG. 4b, RIBS-RX RBS is used to represent a local RBS which needs to do the compensation for the impairment of AFU and RDN. The RBSs which can transmit RIBS signal are named RIBS-TX RBSs. The RIBS signal sent by RIBS-TX RBS from other remote RBSs is called Remote RIBS Sequence. The RIBS signal used by RIBS-RX RBS (i.e. via the RDN) is called Local RIBS Sequence.

In an embodiment, the Local RIBS Sequence may be sent together with the Remote RIBS Sequence(s). That means the RIBS-RX RBS may receive multiple sequences in the receiver as shown in FIG. 4b. Please note that multiple RIBS-TX RBSs may send multiple remote RIBS sequences. In a density cellular network, this scenario may be possible.

When the RIBS-RX RBS receives the remote RIBS sequences from the RIBS-TX RBSs by multiple antennas from 1 to N. N may be a positive integer. The impairments may be determined. The impairments may include 4 portions as shown in FIG. 4b, such as transmitter impairment of RIBS-TX RBS, OTA (Over The Air) impairment, antenna branch (i.e., receiver) impairment of RIB S-RX RBS, and AFU and RDN impairment of RIBS-RX RBS.

Transmitter impairment of RIBS-TX RBS is unknown but it's a common impairment to all the antenna branches of RIBS-RX RBS and this common impairment may be removed as described below.

OTA impairment can be calculated from the AoA (angle of arrival). AoA may be calculated from the antenna information of RBSs, such as the geometry positions, elevation/height, directions, and angle of the antenna of RBSs.

Antenna branch impairment of RIBS-RX RBS may be estimated by a local RIBS sequence (i.e., the received first radio signal).

The impairment of AFU and RDN of RIB S-RX BS may be calculated as below after the other impairments are calculated.

$$\phi_p^{AFU} = \phi_p^{remote} - \phi_p^{local} - \phi_p^{OTA} - \phi^{TX}, \ p = 1, \dots, N_{ANT}$$

In this embodiment, the phase is used for depicting how to calculate the impairment. $N_{ANT}$ is the number of antenna of the first network device. $\phi^{TX}$ is the transmitter impairment of RIBS-TX RBS. The $$\phi_p^{OTA}$$

is the OTA impairment.

$$\phi_p^{local}$$

is the antenna branch impairment of RIBS-RX RBS.

$$\phi_p^{AFU}$$

is the impairment of AFU and RDN of RIBS-RX BS (i.e., the impairment related to the antenna of the first network device).

$$\phi_p^{remote}$$

is the phase impairment of the remote RIBS sequences received from the RIBS-TX RBSs, i.e., the sum of $$\phi_p^{OTA}, \phi_p^{AFU}, \phi^{TX} \text{ and } \phi_p^{local}.$$

A couple of methods and algorithms may be used to determine an impairment related to the antenna of the first network device based on the received first radio signal and the at least one second radio signal. For example, the couple of methods and algorithms may comprise the method of radio signal (or sequence) divisions between the first network device and the at least one second network device, impairment estimations algorithms, LOS path estimation algorithms, etc.

Sequence Generations & Separations

Figure 4C:
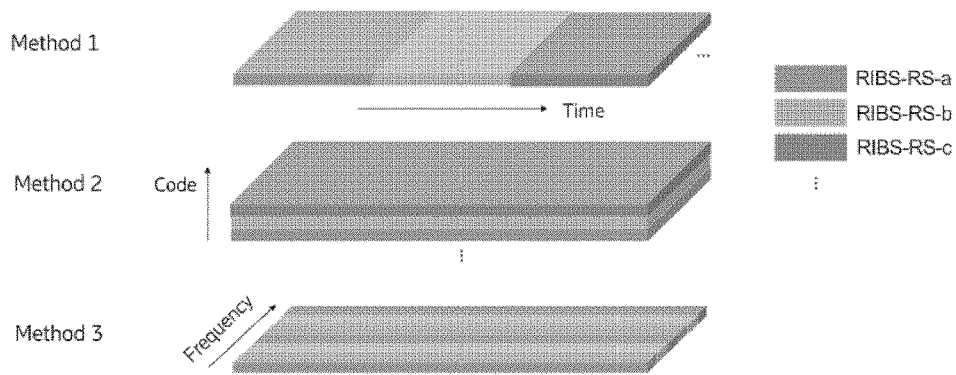
FIG. 4c shows an example of methods of sequence division according to an embodiment of the disclosure.

To separate the sequences between the local and multiple remote RBSs, a couple of methods may be used. FIG. 4c shows an example of methods of sequence division according to an embodiment of the disclosure. Depending on the application, one or multiple methods can be used. For example, the Method 1 for time division might be used in the application of a single RIBS symbol. While the Method 2 for code division and Method 3 for frequency division can be used in the application of multiple RIBS symbols. In other embodiments, at least two of Methods 1, 2 and 3 might be combined.

Method 1—Time Separation

Step 1. For the time separation, the same sequence may be sent in different time slots or subframes as shown in FIG. 4c. The root sequence can be any sequence such as Zadoff-Chu sequence, gold sequence, etc. In this embodiment, the gold sequence is used as an example.

RIBS root sequence C root may be based on the pseudo-random, length-31 Gold sequence as below (Refer to section 5.2.1 of 3GPP standard 3GPP TS 38.211 V16.3.0, the disclosure of which is incorporated by reference herein in its entirety).

$$C_{root}(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

Where the first m-sequence $x_1(n)$ shall be initialized with $x_1(0)=1, x_1(n)=0, n=1, 2, \dots, 30$. The initialization of the second m-sequence $x_2(n)$, is denoted by $C_{init}$.

The $c_{init}$ value required for $x_2(n)$ is calculated as:

$$C_{init}=n_{SCID} \bmod 2^{31}$$

where $n_{SCID}$ is the unique scrambling ID (identifier) which is different for different BS.

Step 2. $C_{root}$ is modulated into QPSK (Quadrature Phase Shift Keying) symbols $CM_{root}$ as below. $N_{sc}$ is the number of active subcarriers. Please note that this is also an example and the modulation might be different in different applications.

$$CM_{root}(n) = \frac{1}{\sqrt{2}}[(1 - 2C_{root}(2n)) + j(1 - 2C_{root}(2n+1))],$$

$$n = 0, \ldots, N_{sc}$$

Step 3. A guard band of zeros might be added. The number of zeros is calculated as $N_{zero}=N_{fft}-N_{sc}$, where $N_{fft}$ is the FFT (Fast Fourier Transform) size, $N_{sc}$ is the number of subcarriers which depends on the numerology and carrier bandwidth, etc.

$$RS(n)=\text{zero\_padding}(CM_{root}(n\in 0, \ldots, N_{sc}-1), N_{zero}),$$
$$n=0, \ldots, N_{fft}-1$$

Step 4. The RS may be converted to a time domain sequence:

$$rs(k)=\text{IFFT}\{RS(n)\}, k=0, \ldots, N_{fft}-1$$

Step 5. A cyclic prefix, which is replica of $N_{cp}$ last samples of rs, is added in front of rs. $N_{cp}$ is the CP (Cyclic Prefix) length.

Step 6. rs is the time domain sequence for one symbol. There might be multiple symbols and each symbol is the replica of rs as below. $N_{sym}$ is the number of symbols.

$$rs_d=rs, d=0,1, \ldots, N_{sym}$$

Method 2—Code Separation

Step 1. For code separation, a root sequence $CM_{root}$ may be generated firstly as described in Step 1 & 2 of the Method 1.

Step 2. A ZC (Zadoff-Chu) dithering sequence of length $N_{sym}$ with parameters $u_{dith}$ and $q_{dith}$ is created as below. $N_{sym}$ is the number of symbols. In an embodiment, $N_{sym}$ may be equal to or larger than 2.

$$Z_{dith}(d) = \exp\left(-j\frac{\pi \cdot u_{dith} \cdot d(d + c + 2q_{dith})}{N_{sym}}\right),$$

$$d = 0, \ldots, N_{sym} - 1, c = \bmod(N_{sym}, 2)$$

Step 3. For each RS symbol, the dithering sequence is circularly shifted $\text{floor}(N_{sc}/N_{bs})$ times, and applied to the root sequence $CM_{root}$. $N_{bs}$ is the number of BS. $N_{bs}$ may be equal or larger than 2. $N_{sc}$ is the number of subcarriers.

$$D_m(d) = \text{curcularshift}\left\{Z_{dith}(d), m \cdot \text{floor}\left(\frac{N_{sc}}{N_{bs}}\right)\right\},$$

$$m = 0, 1, \ldots, N_{bs} - 1$$

$$CM_{m,d}(n) = CM_{root}(n) \cdot D_m(d)$$

For example RIBS-RS-a may be generated as below using m=0. d is the index of symbol. n is the index of subcarrier.

$$CM_{0,d}(n)=CM_{root}(n) \cdot D_0(d)$$

RIBS-RS-b may be generated as below using m=1.

$$CM_{1,d}(n)=CM_{root}(n) \cdot D_1(d)$$

Step 4. A guard band of zeros might be added. The number of zeros is calculated as $N_{zero}=N_{fft}-N_{sc}$, where $N_{fft}$ is the FFT size i.e.:

$$RS_{m,d}(n)=\text{zero\_padding}\{CM_{m,d}(n\in 0, \ldots, N_{sc}-1), N_{zero}\}, n=0, \ldots, N_{fft}-1$$

Step 5. The RS may be converted to a time domain sequence as below:

$$rs_{m,d}(k)=\text{IFFT}\{RS_{m,d}(n)\}, k=0, \ldots, N_{fft}-1$$

Step 6. A cyclic prefix, which is replica of $N_{cp}$ last samples of $rs_{m,d}$, is added in front of $rs_{m,d}$. $N_{cp}$ is the CP length.

Method 3—Frequency Separation

Figure 4D:
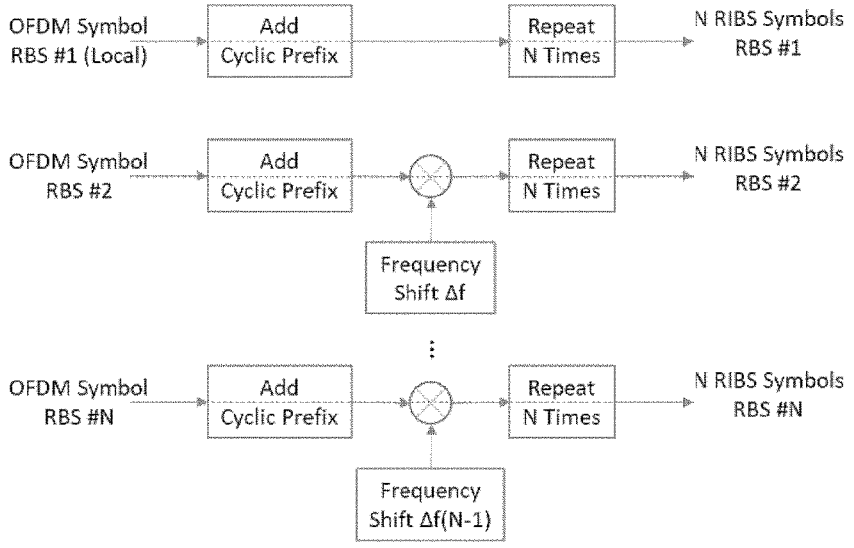
FIG. 4d shows a generation of OFDMA RIBS Symbols by N RBSs according to an embodiment of the present disclosure.

FIG. 4d shows a generation of OFDMA RIBS Symbols by N RBSs according to an embodiment of the present disclosure. The signals from different RBSs may be generated to be separable in the frequency domain as shown in FIG. 4d. Each RBS generates a corresponding OFDM signal. A cyclic prefix is added to allow frame synchronization at the receive side. The OFDM signal is shifted in frequency by m/N-th, m=0, \ldots, N−1 fraction of the FFT resolution, where N is the number of RBSs in the network. Finally, the shifted signal is transmitted N times.

Impairment Estimation

The impairment may be calculated or estimated as below after the signals x(k) are received in RIBS-receiver BS.

Step 1. CP synchronization to find the start of the symbol or frame. the following inner product is calculated over $N_{sb}$ frames. CP may be removed in this step.

$$d_{start} = \max_d \sum_{k=0}^{N_{sb}-1} P(d + k[N_{fft} + N_{cp}])$$

where: $P(d)=\Sigma_{m=d}^{d+N_{cp}-1}x(k)x^*(k+N_{fft})$

Step 2. FFT and active bins are selected.

$$X_d^{fft}(n)=\text{FFT}\{x_d(k)\}, n=0, \ldots, N_{fft}-1$$

$$X_d(n)=X_d^{fft}(n), n=0, \ldots, N_{sc}-1$$

Step 3.1. Sum of Symbols (for method 1 with multiple symbols only)

$$X_m(n) = \frac{1}{N_{sym}} \sum_{d=0}^{N_{sym}-1} X_{m,d}(n), d = 0, \ldots,$$

$$N_{sym} - 1, n = 0, \ldots, N_{fft} - 1, m = 0, 1, \ldots, N_{bs}$$

Step 3.2. Multi-Sequences Separation (for Method 2 only). Since $Z_{dith}(d)$ is orthogonal to each other, the sequences of multiple BSs (base stations) can be separated without interference. Below * denotes the conjugate operation.

Extent it to antenna domain as below, where $N_{ANT}$ is the number of antennas in the receiver BS.

$$\phi_{m,p}(n)=\angle H_{m,p}{}^{LOS}(n), p=1,2, \ldots N_{ANT}$$

$$X_m(n) = \frac{1}{N_{sym}} \sum_{d=0}^{N_{sym}-1} Z^*_{dith}(d) X_{m,d}(n), d = 0, \ldots ,$$

$$N_{sym} - 1, n = 0, \ldots , N_{fft} - 1, m = 0, 1, \ldots , N_{bs}$$

The propagation channel impact of transmitter BS as a common impairment to each antenna may be removed as below:

Step 3.3. Frequency Separation (for Method 3 only)

Figure 4E:
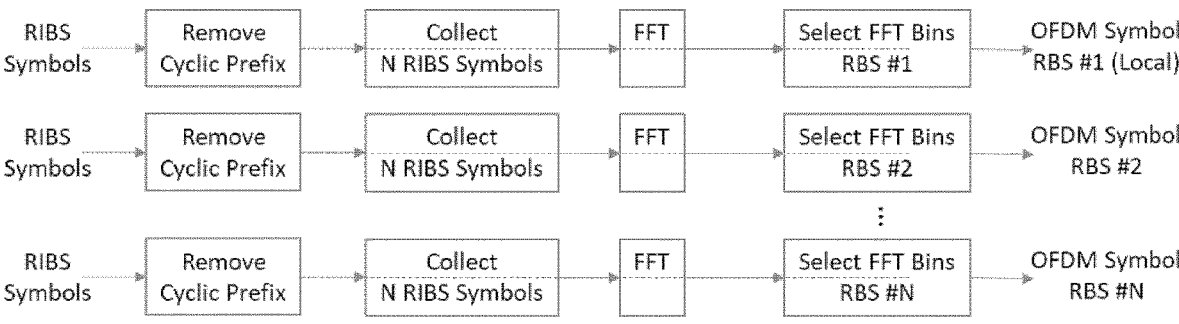
FIG. 4e shows an example of decoding OFDMA RIBS Symbols by N RBSs according to an embodiment of the present disclosure.

FIG. 4e shows an example of decoding OFDMA RIBS Symbols by N RBSs according to an embodiment of the present disclosure. As shown in FIG. 4e, each RBS may perform OFDM frame synchronization using the cyclic prefix of the received OFDMA symbols. N symbols are collected and concatenated together. An FFT of length N symbols is applied. Finally, each RBS may separate between its own and other RBS FFT bins in the frequency domain by selecting the corresponding FFT bins.

Step 4. Matched Filter. $CM_m$ is the circular shift version of $CM_{root}$ for method 1. For method 2 $CM_m=CM_{root}$.

$$H_m(n)=CM^*_m(n)X_m(n)$$

m is the index of a RIBS sequence of an RBS. $N_{ANT}$ is the number of antennas in a BS. $\phi$ denotes the phase of the impairment H.

Step 5. LOS Path Estimation Algorithms

The first peak (LOS path) of the transfer function may be selected based on time domain transfer function. $H_m$ from Step 4 may be transferred to time domain as below.

$$h_m(k)=IFFT(H_m(n))$$

A PDP (Power Delay Profile) can be estimated as below. $T_s$ is the sampling period of the system. t denotes the delay in time.

$$|h_m(t)|^2=|h_m(k^*T_s)|^2$$

The peaks may be identified as below. $t_2$ denotes the delay of one peak. $t_1$ and $t_3$ denotes the delays of neighbor points around the peak. In addition a Threshold may be defined to judge if this is a proper peak.

$$|h_m(t_1)|^2 < |h_m(t_2)|^2 > |h_m(t_3)|^2, \text{if } |h_m(t_2)|^2 > \text{Threshold}$$

Figure 4F:
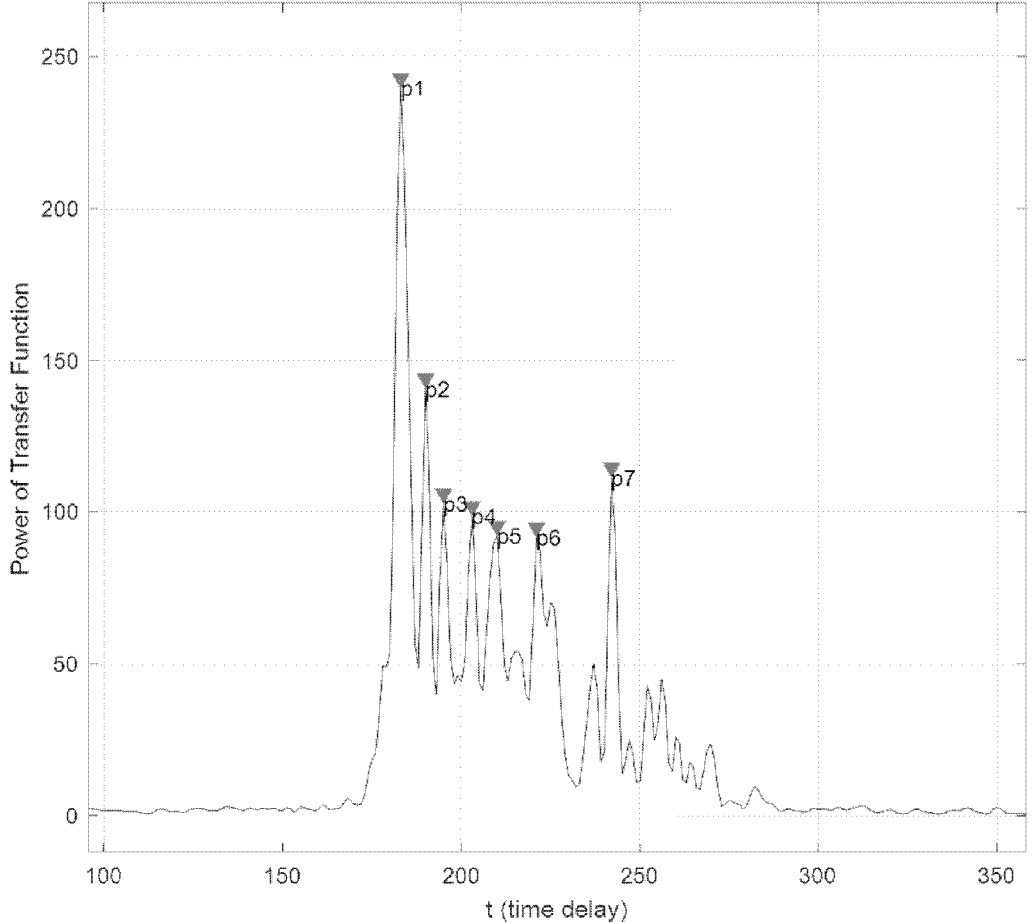
FIG. 4f shows an example of PDP of RIBS transfer function from field according to an embodiment of the present disclosure.

FIG. 4f shows an example of PDP of RIBS transfer function from field according to an embodiment of the present disclosure. It shows that there are multiple peaks even in a LOS scenario. Hence it's expected that multiple delays of peaks can be observed as $t_{p1}, t_{p2}, \ldots t_{pn}$, where pn is the index of peak. The location of LOS path $t_L$ can be found from the first peak of $t_{p1}$.

$$t_L=t_{p1}$$

After the location of the LOS peak is found, a sinc function S can be generated with the delay $t_L$, i.e.

$$S=[1 e^{j2\pi t_L/TS} \ldots e^{j2\pi N St_L/TS} 0]$$

Inner product of S and H to get phase and amplitude:

$$\alpha = \frac{1}{N_s} \sum_n H_m(n)S(n)^*$$

The transfer function of the LOS path can be calculated as below:

$$H_m{}^{LOS=\alpha S}$$

Step 6. Impairment Calculation. The impairment can be calculated as below:

$$\phi_m(n)=\angle H_m{}^{LOS}(n)$$

$$\phi_{TX}(n) =$$

$$\phi_{avg}(n) = \frac{\sum_{p=1}^{N_{ANT}} \phi(p, n)}{N_{ANT}} = \frac{\sum_{p=1}^{N_{ANT}} \left(\phi_{remote,p}(n) - \phi_{local,p}(n) - \phi_p^{OTA}(n)\right)}{N_{ANT}}$$

Eventual the impairment of AFU and RDN can be calculated and compensated in BS.

$$\phi_p^{AFU} = \phi_{remote,p}(n) - \phi_{local,p}(n) - \phi_p^{OTA}(n) - \phi_{avg}(n), p = 1, \ldots , N_{ANT}$$

$$\phi_p^{OTA}$$

can be calculated according to the AoA of the RIBS signal which is derived from the geometric position of the antenna of the transmitter BS. With a relative position coordinate (x, y, z) of the antenna of the transmitter BS with respect to the antenna of the receiver BS, the horizontal angle $\alpha$ and the azimuth angle $\beta$ can be calculated. Then, according to $\alpha$ and $\beta$ the impact of OTA $$\phi_p^{OTA}$$

can be obtained according to H. Krim and M. Viberg, "Two decades of array signal processing research: the parametric approach" IEEE Signal Processing Magazine, vol. 13, no. 4, pp. 67-94, July 1996, the disclosure of which is incorporated by reference herein in its entirety.

In an embodiment, the impairment related to the antenna of the first network device may be determined based on the received first radio signal and multiple second radio signals.

In an embodiment, the first network device may remove a phase vector induced by an incoming wave of each of the at least one second radio signal. The first network device may combine the at least one second radio signal without the induced phase vector. The first network device may remove a propagation channel impact of a transmitter of the combined second radio signal. The first network device may determine an impairment of the receiver connected to the antenna of the first network device. The first network device may determine signal characteristics of the combined second radio signal. The first network device may determine the impairment related to the antenna of the first network device based on the removed propagation channel impact of the transmitter of the combined second radio signal, the impairment of the receiver connected to the antenna of the first network device, and the signal characteristics of the combined second radio signal.

In an embodiment, the phase vector induced by the incoming wave of each of the at least one second radio signal may be removed based on the AoA of an incoming wave of each of the at least one second radio signal.

In an embodiment, the AoA of the incoming wave of each of the at least one second radio signal may be determined based on antenna information of a corresponding second network device and the first network device.

In an embodiment, the antenna information may comprise at least one of a geometry position of an antenna; an elevation of an antenna; a direction of an antenna; or an azimuth of an antenna.

In an embodiment, the at least one second radio signal without the induced phase vector may be combined based on Maximum Ratio Combining (MRC).

In an embodiment, the propagation channel impact of the transmitter of the combined second radio signal may be removed based on the impairment of the receiver connected to the antenna of the first network device and the signal characteristics of the combined second radio signal.

MRC of RIBS Signals From Multiple Remote RBSs

The calibration accuracy of the antenna may be further improved when the RIBS signals are transmitted by multiple RBS's. An example is that three RIBS-TX RBSs namely A, B and C are transmitting RIBS signals toward a RIBS-RX RBS.

Using at least one of Time, Code or Frequency Division methods of generating RIBS signals allows RIBS-RX RBS to separate between its own and other RIBS signals in time, code or frequency domains respectively. Any signal combining technique can be used to estimate $\phi_p^{AFU}$. In an embodiment, the following steps can be performed.

Step 1. the signals from RIBS-TX RBSs A, B and C namely $X_A(p,n)$, $X_B(p, n)$ and $X_C(p, n)$ may be separated by using time, code or frequency multiplexing, where $X_m(p, n) = H_m(p, n) \cdot RS_m(p,n) + noise$ $RS_m$ is the transmitted RIBS signal normalized such that $|RS_m(p,n)|^2 = 1$. $H_m(p,n)$ is the channel transfer function from RIBS-TX RBS m to antenna branch p of RIBS-RX RBS, m=A, B, C, and n=0, . . . , $N_{fft}-1$ is the FFT bin.

Step 2. Given the AoAs and the antenna geometry of RBSs, the phases induced by the incoming waves may be calculated and removed, i.e. for every FFT bin n $$\hat{X}_m(p, n) = X_m(p, n) \cdot \exp(-j2\pi\phi_p^{OTA,m}(n)), \, m = A, B, C$$

Step 3. The channel gain $r_m(p, n) = H_m(p, n)/H_m(p,m)|^2$ of antenna branch p may be estimated as the cross-correlation coefficient of the first received peak.

Step 4. $\hat{X}_A(p,n)$, $\hat{X}_B(p, n)$ and $\hat{X}_C(p, n)$ may be combined using Maximum Ratio Combining (MRC), i.e.

$$\hat{X}_{MRC}(p, n) = \frac{SINR_A(p) \cdot r_A^*(p, n) \cdot \hat{X}_A(p, n) + SINR_B(p) \cdot r_B^*(p, n) \cdot \hat{X}_B(p, n) + SINR_C(p) \cdot r_C^*(p, n) \cdot \hat{X}_C(p, n)}{SINR_A(p) + SINR_B(p) + SINR_C(p)},$$

where $SINR_m(p)$ represents SINR of the RIBS signal from $m^{th}$ RBS measured at antenna branch p. $SINR_m(p)$ is assumed to be estimated and known at the DU baseband for link adaptation.

Step 5. The AFU and RDN impairment $$\phi_p^{AFU}$$

may be estimated from $\hat{X}_{MRC}(p, n)$ as described above in section "Impairment Estimation".

Step 6. The steps 1-6 in Impairment Estimation can be calculated according to $\hat{X}_{MRC}(p, n)$ without $$\phi_p^{OTA}.$$

An extension of the AFU and RDN impairment estimation with any other suitable number of RBSs (such as more than three RBSs) is straightforward for those skilled in art.

Figures 4G, 5:
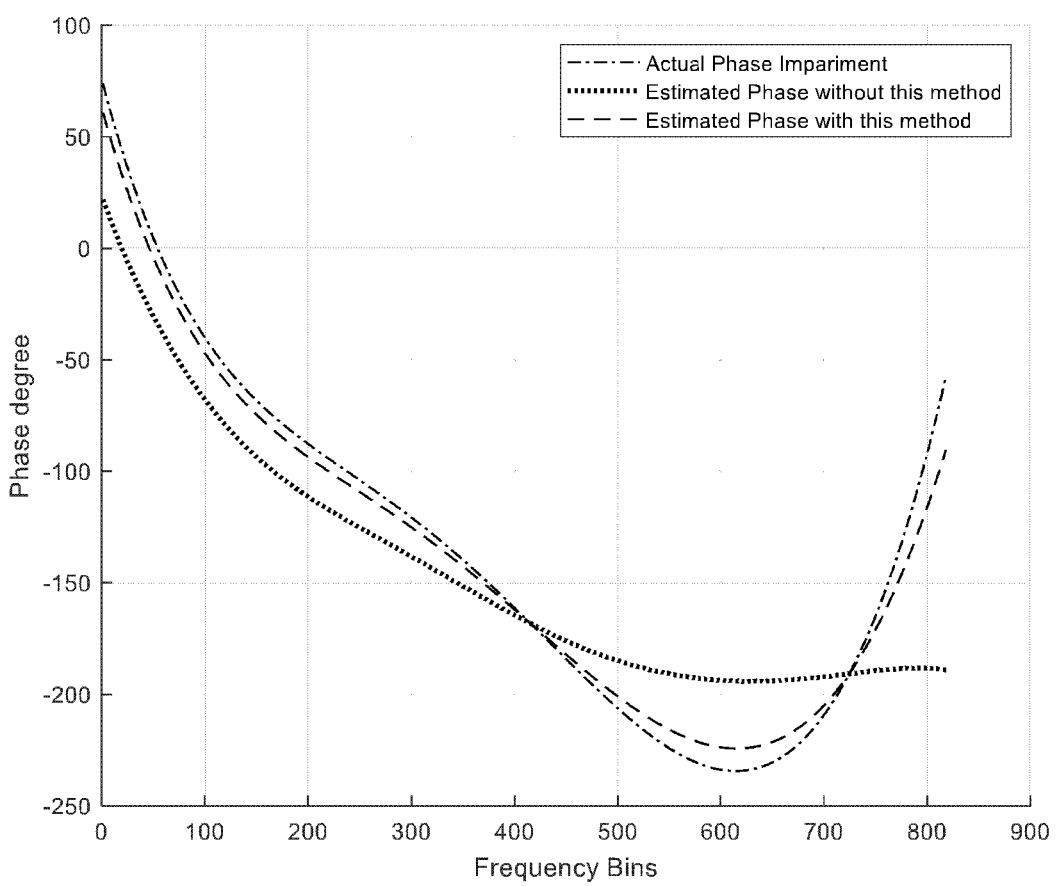
FIG. 4g shows a simulation result of the phase estimation with and without the proposed method.
FIG. 5 shows a flowchart of a method according to another embodiment of the present disclosure.

FIG. 4g shows a simulation result of the phase estimation with and without the proposed method. As shown in FIG. 4g, the curve of estimated phase with the proposed method is close to the actual phase impairment. The curve of the estimated phase without the proposed method has a big delta comparing to the curve of the actual phase impairment because it doesn't measure and compensate the AFU and RDN phase error.

With reference to FIG. 3, at block 308, optionally, the first network device may calibrate the antenna of the first network device based on the impairment related to the antenna of the first network device.

At block 310, optionally, the first network device may communicate with a wireless device (such as another network device or a terminal device) via the calibrated antenna.

FIG. 5 shows a flowchart of a method according to another embodiment of the present disclosure, which may be performed by an apparatus implemented in/as a terminal device or communicatively coupled to the terminal device. As such, the apparatus may provide means or modules for accomplishing various parts of the method 500 as well as means for accomplishing other processes in conjunction with other components. For some parts which have been described in the above embodiments, detailed description thereof is omitted here for brevity.

At block 502, the terminal device may communicate with a first network device. As described above, an impairment related to an antenna of the first network device is determined by the first network device based on a first radio signal generated by the first network device and at least one second radio signal from at least one second network device.

Figure 6:
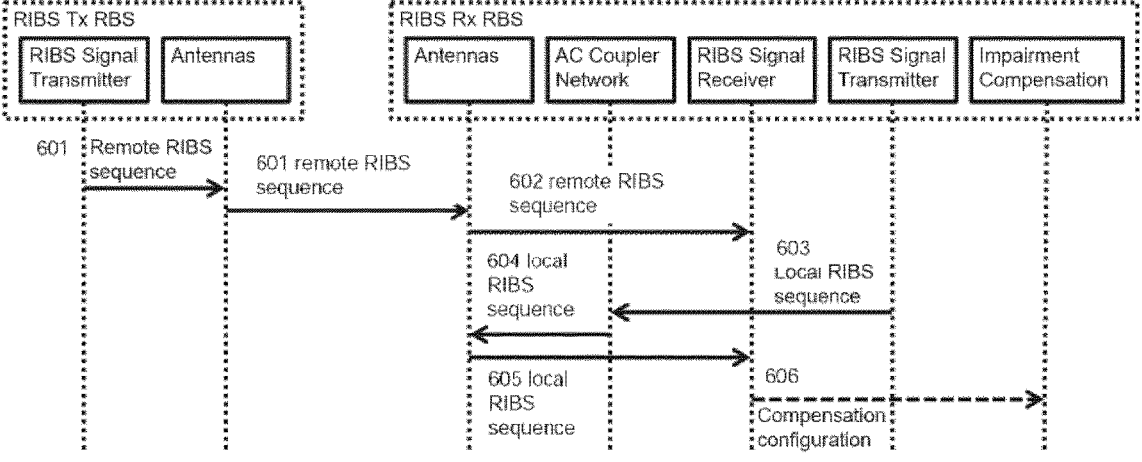
FIG. 6 shows a flowchart of a method according to another embodiment of the present disclosure.

FIG. 6 shows a flowchart of a method according to another embodiment of the present disclosure.

At step 601, the RIBS signal transmitter of the RIBS Tx RBS may transmit a RIBS signal (i.e., the remote RIBS sequence) to a RIBS Rx RBS via the antenna of the RIBS Tx RBS.

At step 602, the antenna of the RIBS Rx RBS may receive the remote RIBS sequence via and transmit it to the RIBS signal receiver of the RIBS Rx RBS.

At step 603, the RIBS signal transmitter of the RIBS Rx RBS may transmit a RIBS signal (i.e., the local RIBS sequence) to an AC couple network of the RIBS Rx RBS.

At step 604, the AC couple network of the RIBS Rx RBS may transmit the local RIBS sequence to the antenna of the RIBS Rx RBS.

At step 605, the antenna of the RIBS Rx RBS may receive the local RIBS sequence and transmit it to the RIBS signal receiver of the RIBS Rx RBS.

At step 606, the RIBS signal receiver of the RIBS Rx RBS may run the proposed method according to various embodiments of the present disclosure to determine an impairment related to the antenna of the RIBS Rx RBS and may send a compensation configuration message to the impairment compensation module based on the determined impairment related to the antenna of the RIBS Rx RBS.

The various blocks/steps shown in FIGS. 3, 5 and 6 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
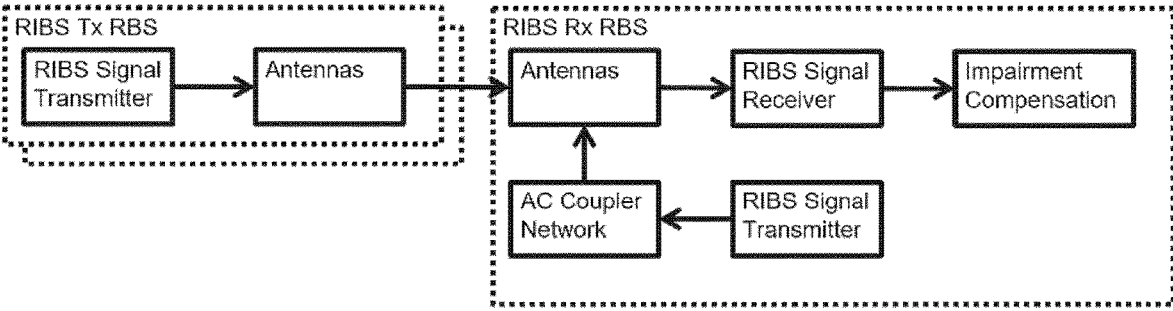
FIG. 7 shows an example of functional architecture according to an embodiment of the present disclosure.

FIG. 7 shows an example of functional architecture according to an embodiment of the present disclosure. As shown in FIG. 7, there may be multiple the RIBS Tx RBS each of which may comprise a RIBS signal transmitter and an antenna. The RIBS signal transmitter may transmit a RIBS signal to a RIBS Rx RBS via the antenna of the RIBS Tx RBS. The RIBS Rx RBS may comprise an antenna, a RIBS signal receiver, an impairment compensation module, an AC coupler network, and a RIBS signal transmitter. The RIBS signal transmitter of The RIBS Rx RBS may transmit a RIBS signal to the antenna of the RIBS Rx RBS via the AC coupler network. In this way the antenna of the RIBS Rx RBS may receive a local RIBS signal and at least one remote RIBS signal and then send them to the RIBS signal receiver. The RIBS signal receiver may run the proposed method according to various embodiments of the present disclosure to determine an impairment related to the antenna of the RIBS Rx RBS. The RIBS signal receiver may send a compensation configuration message to the impairment compensation module based on the determined impairment related to the antenna of the RIBS Rx RBS.

According to various embodiments, a network with multiple Radio Base Stations (RBS) is defined where each RBS can connect with at least one of RBSs by Over-The-Air (OTA) channels. One of RBSs may be selected to perform the calibration and at least one of the other RBSs surrounding it may be selected to help the selected RBSs to perform the calibration. The calibration may be performed for the RBSs inside the network until all RBSs have been calibrated.

According to various embodiments, in order to separate the signal from a local RBS (that is to be calibrated) and at least one remote RBS (that is to assist the calibration), there is introduced several signal separations approaches, including time-domain, frequency-domain, and code-domain separations. It can use only one approach in the process. Alternatively a flexible combination of different approaches is possible according to the circumstance.

According to various embodiments, the calibration signals may be transmitted from the local RBS as well as from the remote RBSs. It is noted that the calibration signal inside the local RBS can be used to determine the impairment of antenna branches of the local RBS, while the calibration signal from the remote RBSs can be used to determine the other impairments such as the impairments of local RBS AFU, OTA, remote RBS transmitter, etc.

According to various embodiments, a receiver is designed to extract the information that is needed to compensate the impairment. The first peak searching of LOS channel and maximum-ratio combination for multiple remote RBSs are proposed to differentiate a local receiver to other remote receivers.

Embodiments herein may provide many advantages, of which a non-exhaustive list of examples follows. In some embodiments herein, the proposed solution can leverage the 3GPP standard signal, e.g., RIBS, to do measurement and compensation for antenna impairment such as AFU and RDN impairment online and over-the-air. In some embodiments herein, the proposed solution can compensate the antenna impairment due to the environment changes such as temperature change, aging, etc. In some embodiments herein, the proposed solution can save the cost in antenna production. In some embodiments herein, the proposed solution can check the OTA AC status periodically. In some embodiments herein, the proposed solution can be easily deployed in the operation networks for example via a software upgrade. In some embodiments herein, the proposed solution can provide accurate impairment estimation via different signal separation approaches. In some embodiments herein, the proposed solution can remove the uncertainty in the OTA calibration. In some embodiments herein, the proposed solution can provide an advanced receiver which is resilient to interference and noise.

Figure 8A:
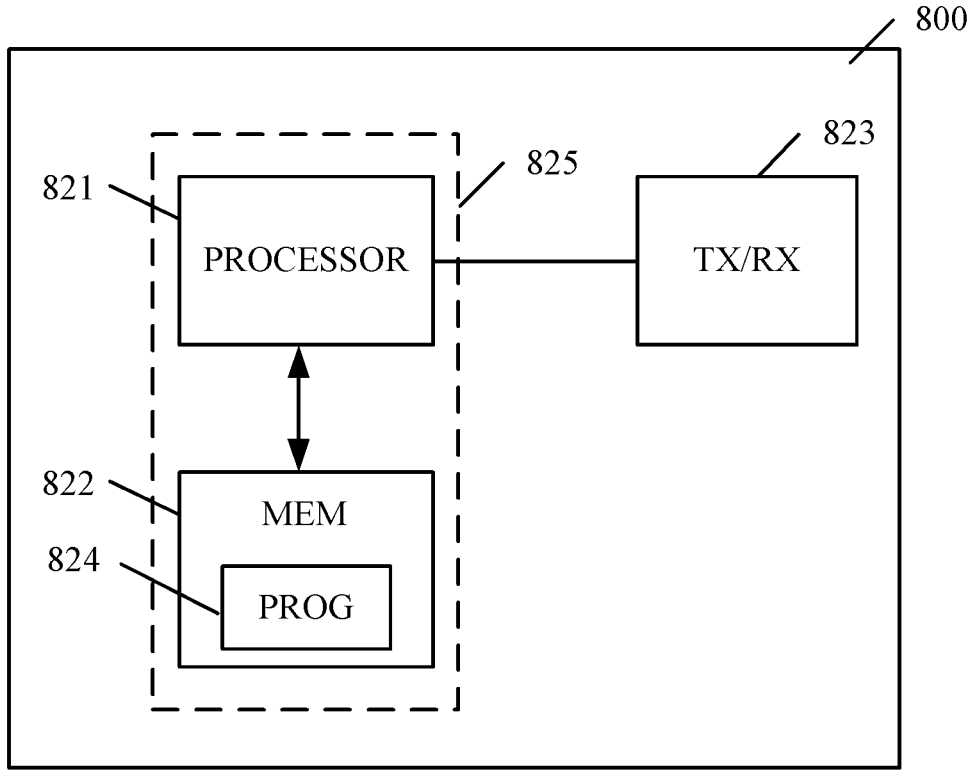
FIG. 8a is a block diagram showing an apparatus suitable for practicing some embodiments of the disclosure.

FIG. 8_a_ is a block diagram showing an apparatus suitable for practicing some embodiments of the disclosure. For example, any one of the first network device and the terminal device described above may be implemented as or through the apparatus 800.

The apparatus 800 comprises at least one processor 821, such as a digital processor (DP), and at least one memory (MEM) 822 coupled to the processor 821. The apparatus 820 may further comprise a transmitter TX and receiver RX 823 coupled to the processor 821. The MEM 822 stores a program (PROG) 824. The PROG 824 may include instructions that, when executed on the associated processor 821, enable the apparatus 820 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the first network device, the memory 822 contains instructions executable by the processor 821, whereby the network function operates according to any of the methods related to the first network device as described above.

In an embodiment where the apparatus is implemented as or at the terminal device, the memory 822 contains instructions executable by the processor 821, whereby the terminal device operates according to the method related to the terminal device as described above.

Figure 8B:
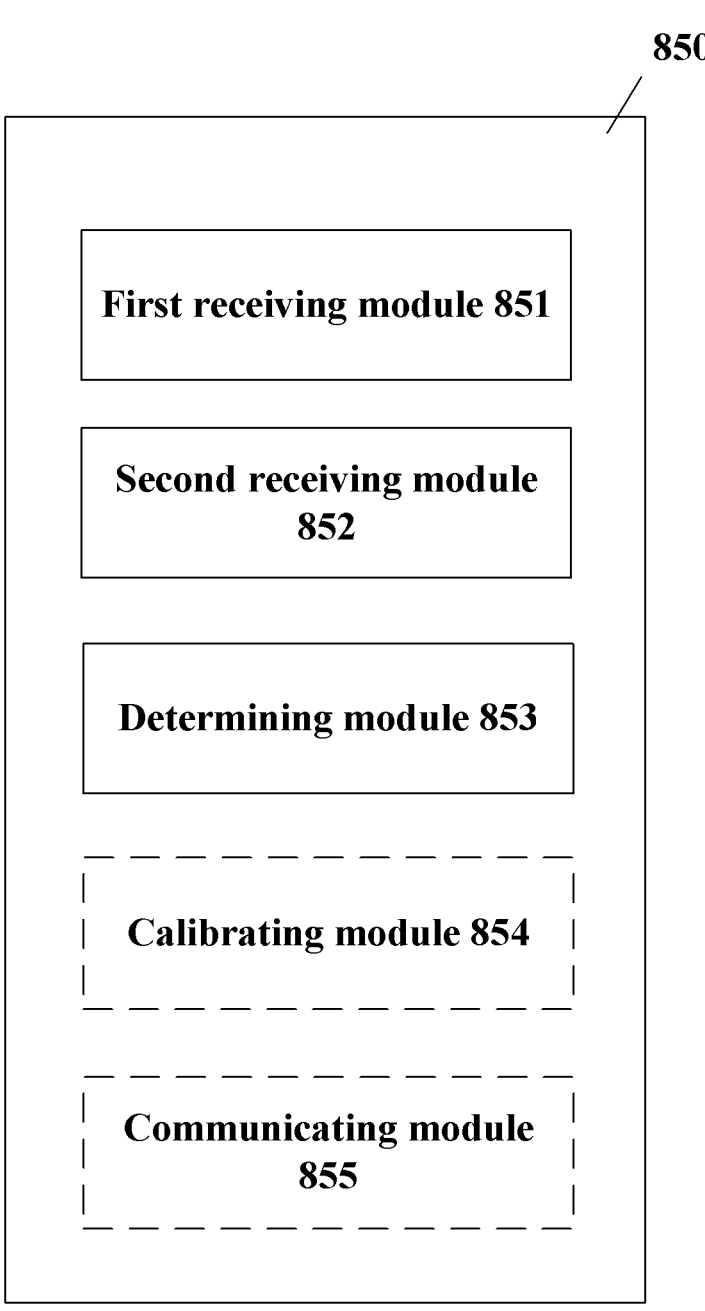
FIG. 8b is a block diagram showing a first network device according to an embodiment of the disclosure.

FIG. 8*b* is a block diagram showing a first network device according to an embodiment of the disclosure. As shown, the first network device 850 comprises a first receiving module 851, a second receiving module 852, and a determining module 853. The first receiving module 851 may be configured to receive a first radio signal generated by the first network device via a receiver connected to an antenna of the first network device. The second receiving module 852 may be configured to receive at least one second radio signal from at least one second network device via the antenna of the first network device. The determining module 853 may be configured to determine an impairment related to the antenna of the first network device based on the received first radio signal and the at least one second radio signal. There is a LOS path between the antenna of the first network device and the antenna of each of the at least one second network device.

In an embodiment, the first network device 850 may further comprise a calibrating module 854 configured to calibrate the antenna of the first network device based on the impairment related to the antenna of the first network device. The first network device 850 may further comprise a communicating module 855 configured to communicate with a wireless device via the calibrated antenna.

Figure 8C:
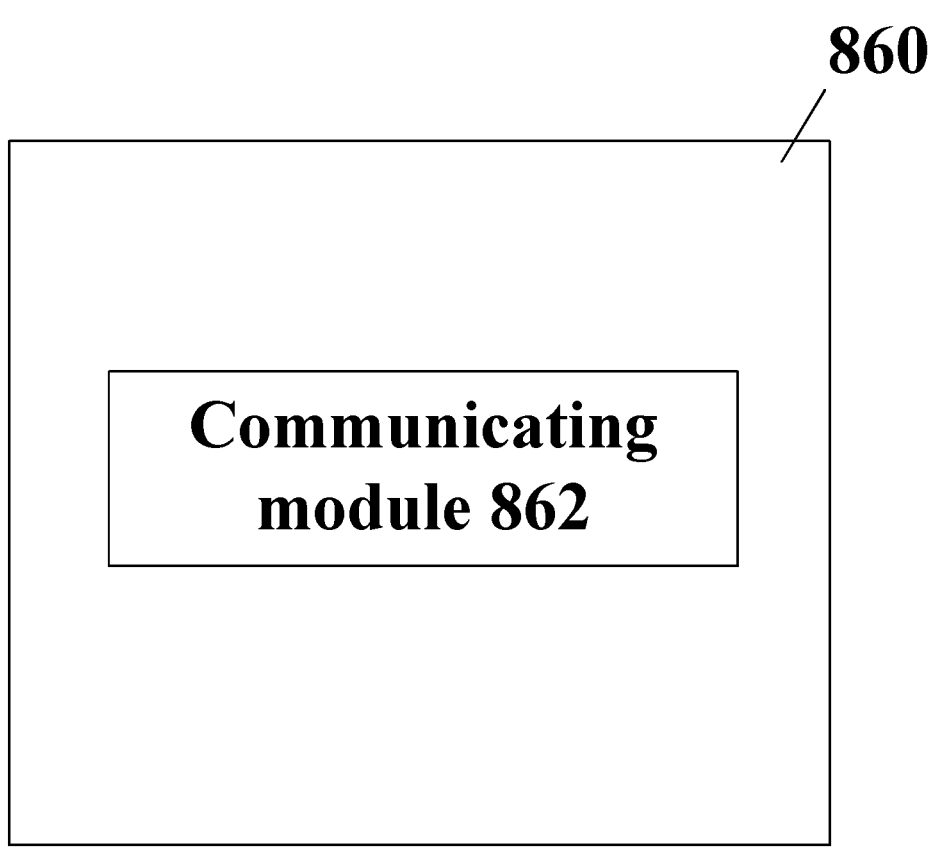
FIG. 8c is a block diagram showing a terminal device according to an embodiment of the disclosure.

FIG. 8*c* is a block diagram showing a terminal device according to an embodiment of the disclosure. As shown, the terminal device 860 comprises a communicating module 861. The communicating module 862 may be configured to communicate with a first network device. An impairment related to an antenna of the first network device is determined based on a first radio signal generated by the first network device and at least one second radio signal from at least one second network device.

In an embodiment, there is provided an antenna, wherein the AFU is outside the antenna calibration loop.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the first network device and the terminal device may not need a fixed processor or memory, any computing resource and storage resource may be arranged from the first network device and the terminal device in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Further, the exemplary overall commutation system including the terminal device and the network node such as network function will be introduced as below.

Embodiments of the present disclosure provide a communication system including a host computer including:

processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9:
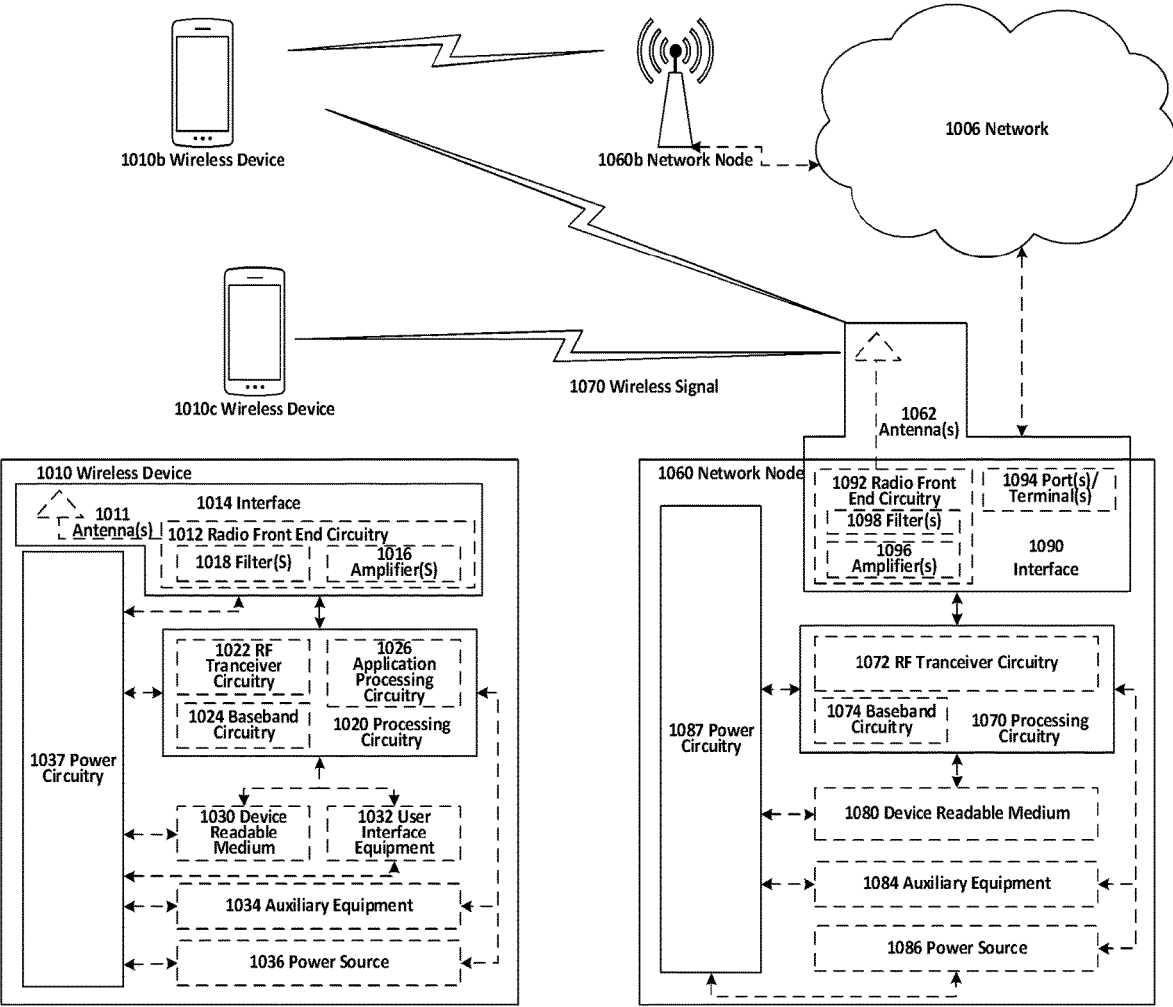
FIG. 9 is a schematic showing a wireless network in accordance with some embodiments.

FIG. 9 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1006, network nodes 1060 (corresponding to network side node) and 1060*b*, and WDs (corresponding to terminal device) 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node

1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
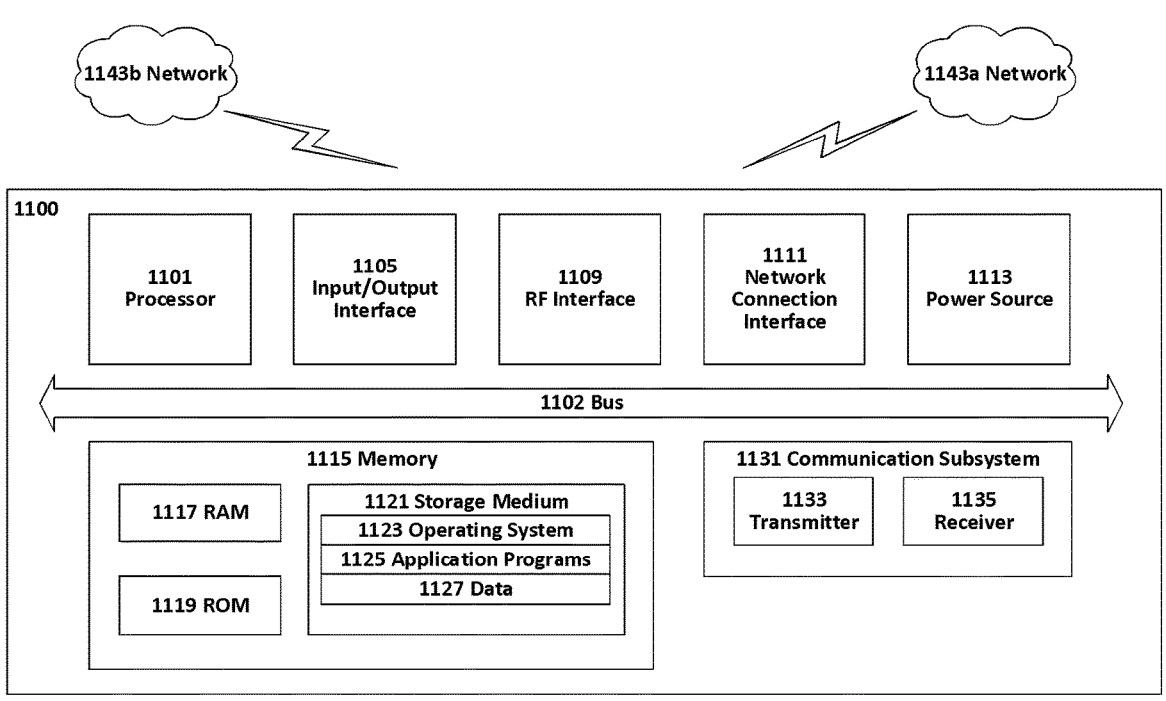
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a LIE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
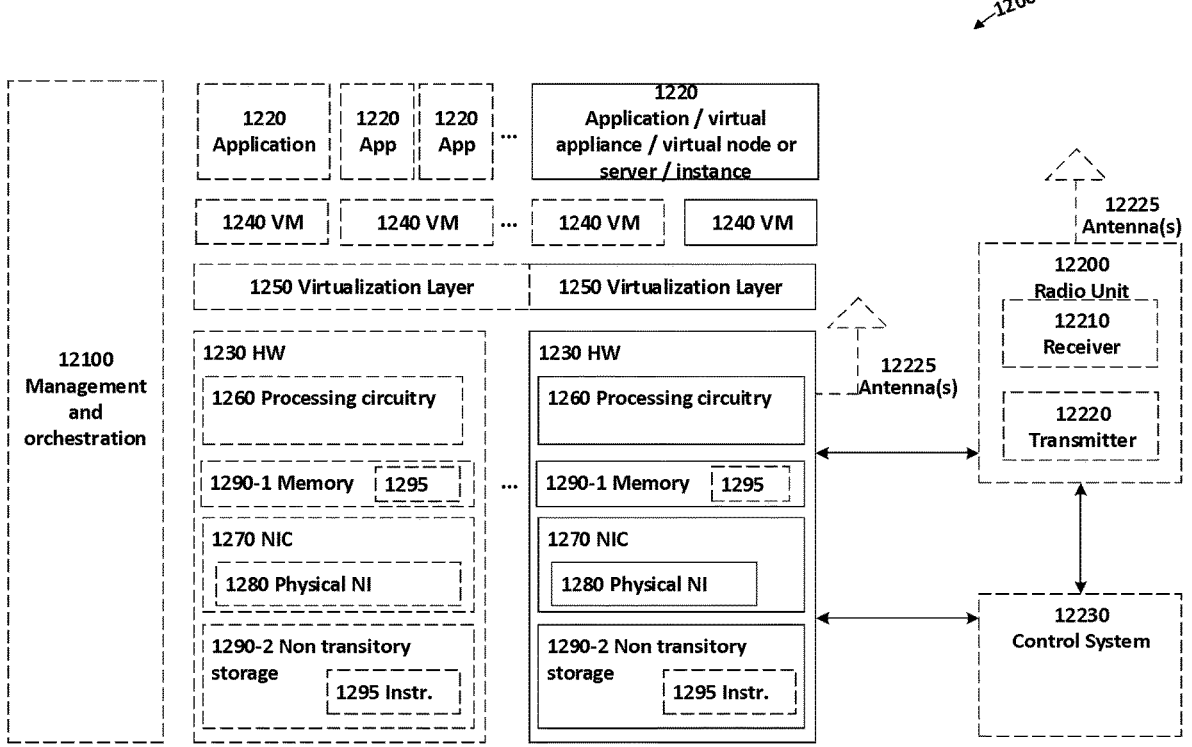
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
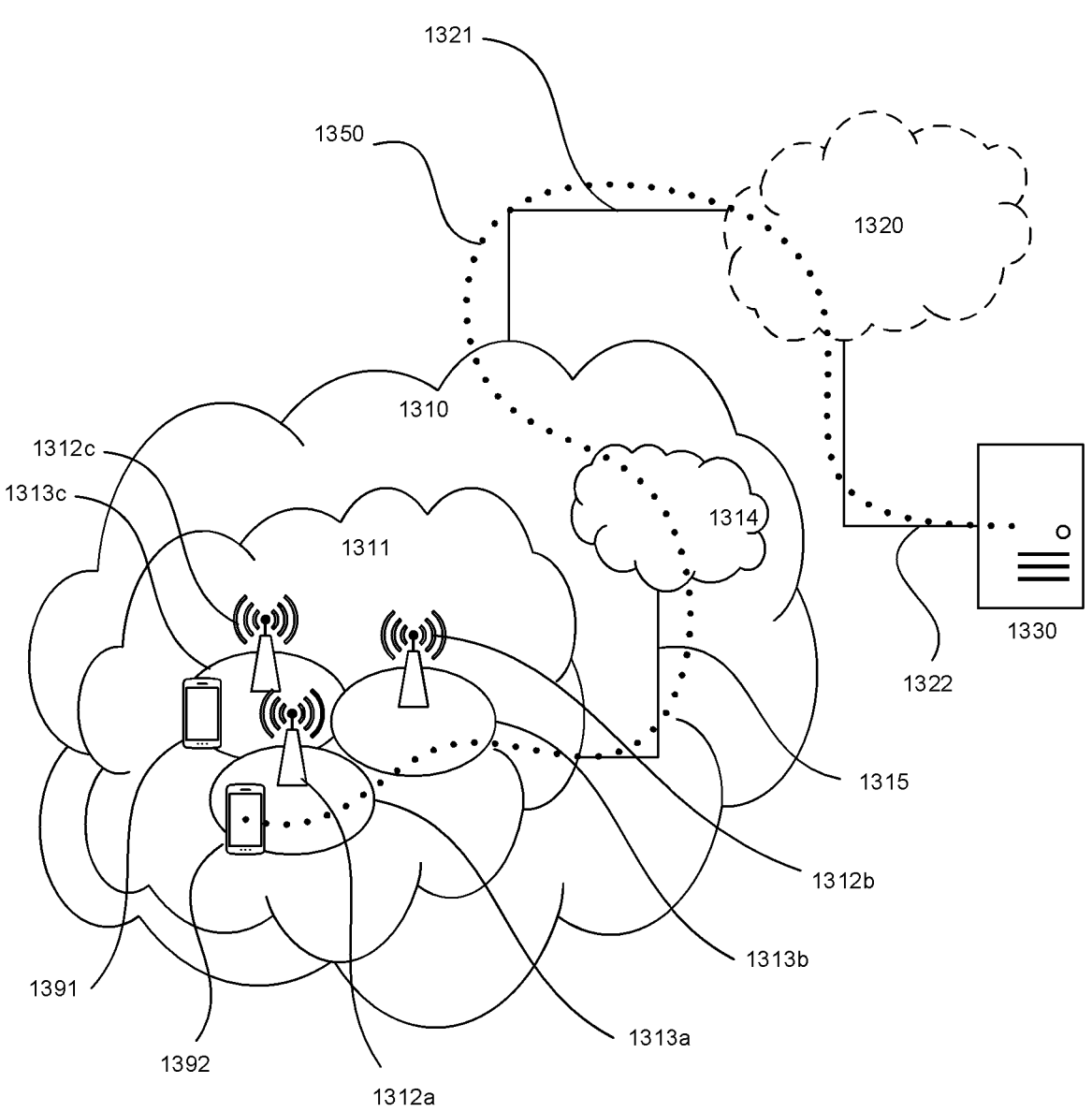
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 13:
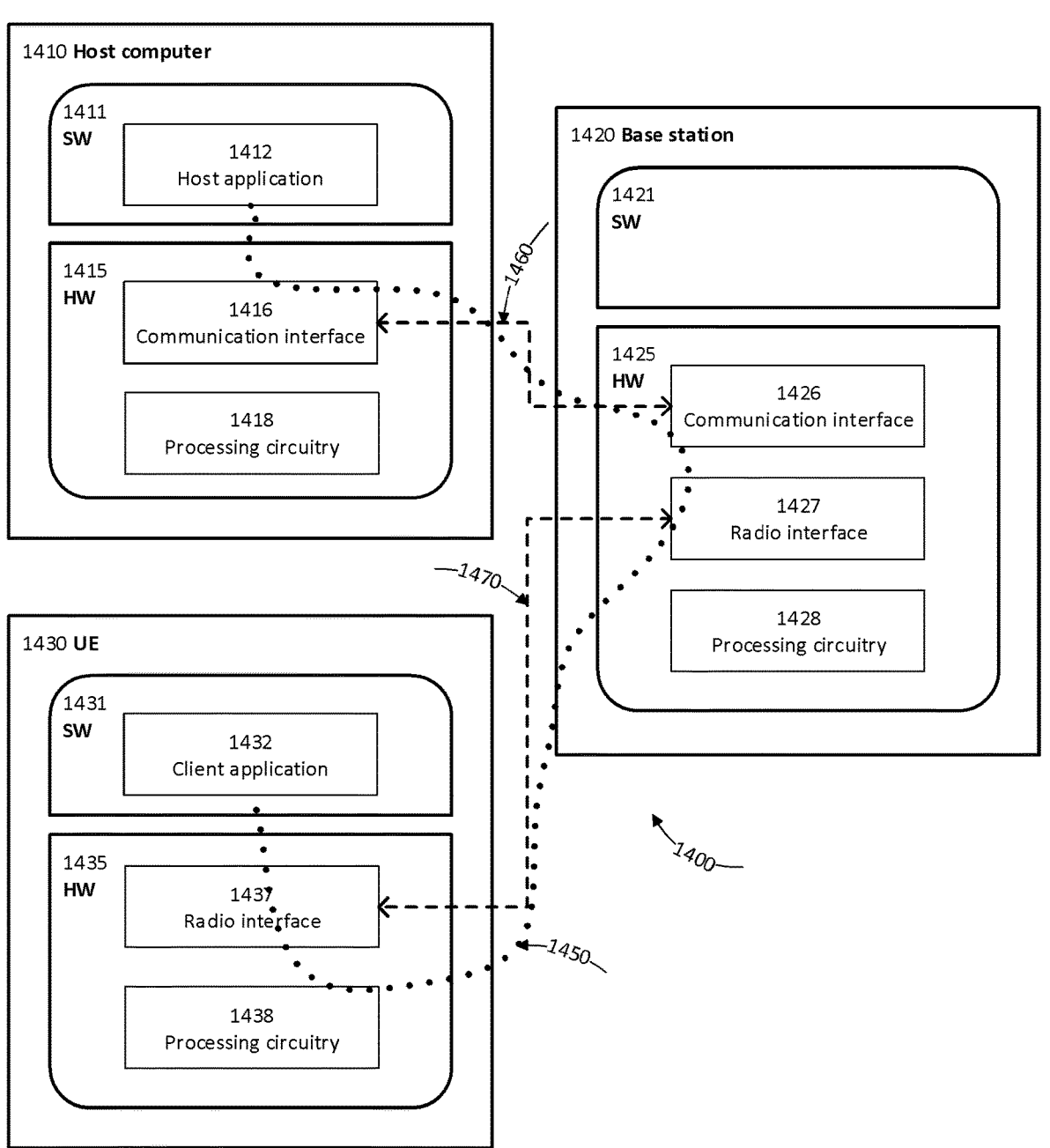
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312*a*, 1312*b*, 1312*c* and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
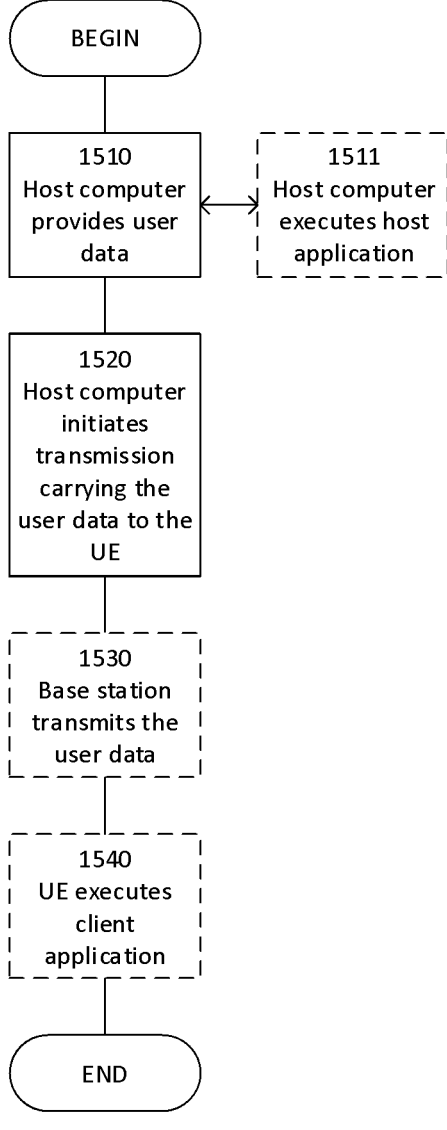
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
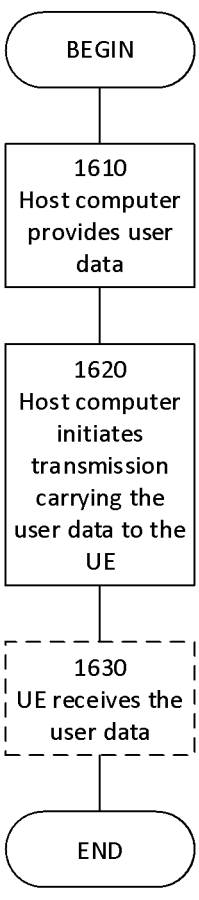
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
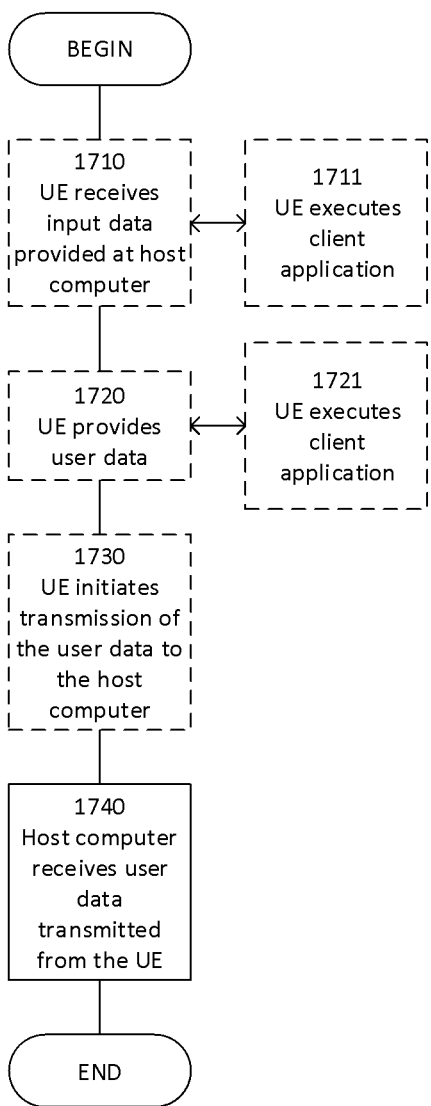
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
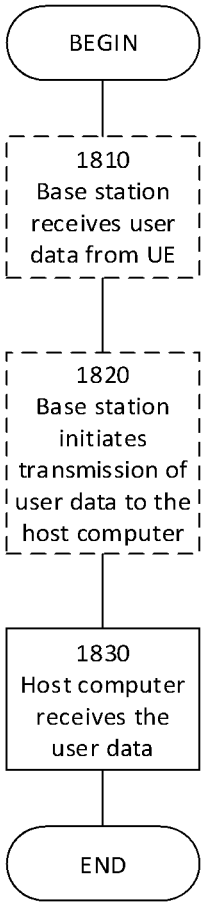
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented at a first network device, the method comprising:

receiving a first radio signal generated by the first network device via a receiver connected to an antenna of the first network device, wherein the first radio signal is a calibration reference signal generated by a transmitter of the first network device for antenna calibration purposes;

receiving at least one second radio signal generated by at least one second network device via the antenna of the first network device; and determining an impairment related to the antenna of the first network device based on the received first radio signal and the at least one second radio signal, wherein there is a line of sight, LOS, path between the antenna of the first network device and an antenna of each of the at least one second network device.

2. The method according to claim 1, further comprising:

calibrating the antenna of the first network device based on the impairment related to the antenna of the first network device; and communicating with a wireless device via the calibrated antenna.

3. The method according to claim 1, wherein determining the impairment related to the antenna of the first network device based on the received first radio signal and the at least one second radio signal comprises:

removing a propagation channel impact of a transmitter of one of the at least one second network device;

determining channel information of Over The Air, OTA, of the second radio signal from the one of the at least one second network device;

determining an impairment of the receiver connected to the antenna of the first network device;

determining signal characteristics of the second radio signal received from the one of the at least one second network device; and determining the impairment related to the antenna of the first network device based on the removed propagation channel impact of the transmitter of one of the at least one second network device, the channel information of OTA of the second radio signal from the one of the at least one second network device, the impairment of the receiver connected to the antenna of the first network device, and the signal characteristics of the second radio signal received from the one of the at least one second network device.

4. The method according to claim 3, wherein the propagation channel impact of the transmitter of one of the at least one second network device is removed based on the channel information of OTA of the second radio signal from the one of the at least one second network device, the impairment of the receiver connected to the antenna of the first network device, and the signal characteristics of the second radio signal received from the one of the at least one second network device.

5. The method according to claim 3, wherein the channel information of OTA of the second radio signal from the one of the at least one second network device is determined based on an angle of arrival, AoA, of the second radio signal from the one of the at least one second network device:

wherein the AoA of the second radio signal from the one of the at least one second network device is determined based on antenna information of the one of the at least one second network device and the first network device;

wherein the antenna information comprises at least one of:

a geometry position of an antenna;

an elevation of an antenna;

a direction of an antenna; or an azimuth of an antenna.

6. The method according to claim 3, wherein the signal characteristics of the second radio signal received from the one of the at least one second network device is determined based on a transfer function related to the LOS path between the antenna of the first network device and the antenna of the one of the at least one second network device.

7. The method according to claim 6, wherein the transfer function related to the LOS path between the antenna of the first network device and the antenna of the one of the at least one second network device is determined based on a first peak of a power delay profile of the transfer function related to the LOS path between the antenna of the first network device and the antenna of the one of the at least one second network device; wherein the first peak of the power delay profile of the transfer function related to the LOS path between the antenna of the first network device and the antenna of the one of the at least one second network device is required to be greater than a threshold.

8. The method according to claim 3, wherein the signal characteristics of the second radio signal received from the one of the at least one second network device comprise a phase impairment of the second radio signal received from the one of the at least one second network device.

9. The method according to claim 1, wherein determining the impairment related to the antenna of the first network device based on the received first radio signal and the at least one second radio signal comprises:

removing a phase vector induced by an incoming wave of each of the at least one second radio signal;

combining the at least one second radio signal without the induced phase vector;

removing a propagation channel impact of a transmitter of the combined second radio signal;

determining an impairment of the receiver connected to the antenna of the first network device;

determining signal characteristics of the combined second radio signal; and determining the impairment related to the antenna of the first network device based on the removed propagation channel impact of the transmitter of the combined second radio signal, the impairment of the receiver connected to the antenna of the first network device, and the signal characteristics of the combined second radio signal.

10. The method according to claim 9, wherein the phase vector induced by the incoming wave of each of the at least one second radio signal is removed based on an angle of arrival, AoA, of an incoming wave of each of the at least one second radio signal.

11. The method according to claim 10, wherein the AoA of the incoming wave of each of the at least one second radio signal is determined based on antenna information of a corresponding second network device and the first network device.

12. The method according to claim 11, wherein the antenna information comprises at least one of:

a geometry position of an antenna;

an elevation of an antenna;

a direction of an antenna; or an azimuth of an antenna.

13. The method according to claim 9, wherein the at least one second radio signal without the induced phase vector is combined based on Maximum Ratio Combining, MRC;

wherein the propagation channel impact of the transmitter of the combined second radio signal is removed based on the impairment of the receiver connected to the antenna of the first network device and the signal characteristics of the combined second radio signal;

wherein the signal characteristics of the combined second radio signal comprise a phase impairment of the combined second radio signal.

14. The method according to claim 3, wherein the impairment of the receiver connected to the antenna of the first network device is determined based on the received first radio signal.

15. The method according to claim 1, wherein the first radio signal and the at least one second radio signal are transmitted by using at least one of Code Division Multiple Access, CDMA, Time Division Multiple Address, TDMA, or Frequency Division Multiple Access, FDMA.

16. The method according to claim 15, wherein when the first radio signal and/or the at least one second radio signal are transmitted by using FDMA, the first radio signal and/or the at least one second radio signal are repeated by N times, wherein N is a number of the network devices in a network.

17. The method according to claim 1, wherein the antenna of the first network device is an antenna subarray of an antenna array or an antenna element of a radio distributed network.

18. The method according to claim 1, wherein the antenna of the first network device comprises at least one antenna integrated filter unit and/or a radio distribution network, RDN.

19. The method according to claim 1, wherein the first network device is a radio access network, RAN;

wherein the first radio signal and the at least one second radio signal are synchronization reference signals; and received via the receiver connected to the antenna of the first network device through the coupler network of the first network device.

20. A first network device, comprising:

a processor; and a memory, the memory containing instructions executable by the processor, whereby the first network device is operative to:

receive a first radio signal generated by the first network device via a receiver connected to an antenna of the first network device, wherein the first radio signal is a calibration reference signal generated by a transmitter of the first network device for antenna calibration purposes;

receive at least one second radio signal generated by at least one second network device via the antenna of the first network device; and determine an impairment related to the antenna of the first network device based on the received first radio signal and the at least one second radio signal, wherein there is a line of sight, LOS, path between the antenna of the first network device and an antenna of each of the at least one second network device.

* * * * *